United States Patent
Nakaseko

(10) Patent No.: US 9,160,943 B2
(45) Date of Patent: Oct. 13, 2015

(54) IMAGING APPARATUS, IMAGING METHOD, AND PROGRAM

(71) Applicant: Sony Corporation, Tokyo (JP)

(72) Inventor: Tetsuji Nakaseko, Fukuoka (JP)

(73) Assignee: Sony Corporation, Tokyo (JP)

( * ) Notice: Subject to any disclaimer, the term of this patent is extended or adjusted under 35 U.S.C. 154(b) by 65 days.

(21) Appl. No.: 13/780,478

(22) Filed: Feb. 28, 2013

(65) Prior Publication Data

US 2013/0258145 A1    Oct. 3, 2013

(30) Foreign Application Priority Data

Mar. 30, 2012   (JP) ................................ 2012-078650

(51) Int. Cl.
*H04N 5/357* (2011.01)
*H04N 5/347* (2011.01)
*H04N 5/367* (2011.01)

(52) U.S. Cl.
CPC ............... *H04N 5/357* (2013.01); *H04N 5/347* (2013.01); *H04N 5/367* (2013.01)

(58) Field of Classification Search
CPC ...... H04N 5/367; H04N 5/3675; H04N 5/357; H04N 5/3572; H04N 9/045; H04N 5/3561
See application file for complete search history.

(56) References Cited

U.S. PATENT DOCUMENTS

| | | | |
|---|---|---|---|
| 7,027,089 B2 * | 4/2006 | Kwon et al. | 348/247 |
| 7,667,748 B2 * | 2/2010 | Kono | 348/246 |
| 8,284,277 B2 * | 10/2012 | Nikai | 348/245 |
| 2012/0154646 A1* | 6/2012 | Sai et al. | 348/246 |
| 2013/0128082 A1* | 5/2013 | Kiyosawa et al. | 348/246 |

FOREIGN PATENT DOCUMENTS

JP    2010-028423 A    2/2010

* cited by examiner

*Primary Examiner* — Luong T Nguyen
(74) *Attorney, Agent, or Firm* — Michael Best & Friedrich LLP

(57) ABSTRACT

There is provided an imaging apparatus including a correction section configured to amplify an addition pixel value, which is a value obtained by adding results of photoelectric conversion on a plurality of pixels, according to an amplification factor set based on a number of defective pixels included in the plurality of pixels, and output the amplified addition pixel value as a corrected addition pixel value.

8 Claims, 15 Drawing Sheets

FIG. 4
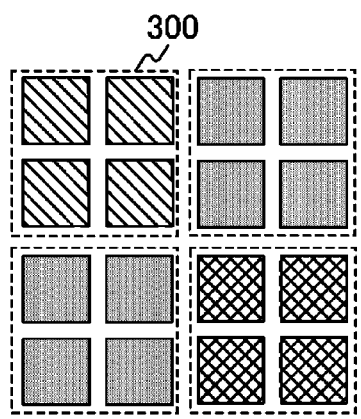
(a)
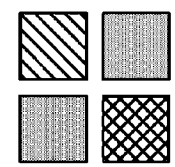
FOUR-PIXEL ADDITION READING
(b)
FULL-PIXEL READING
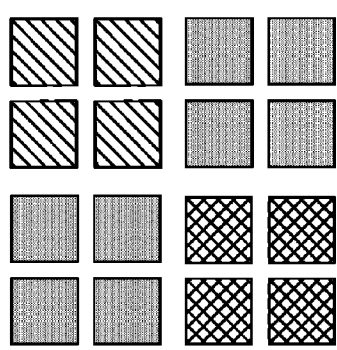
(d)

FIG. 8
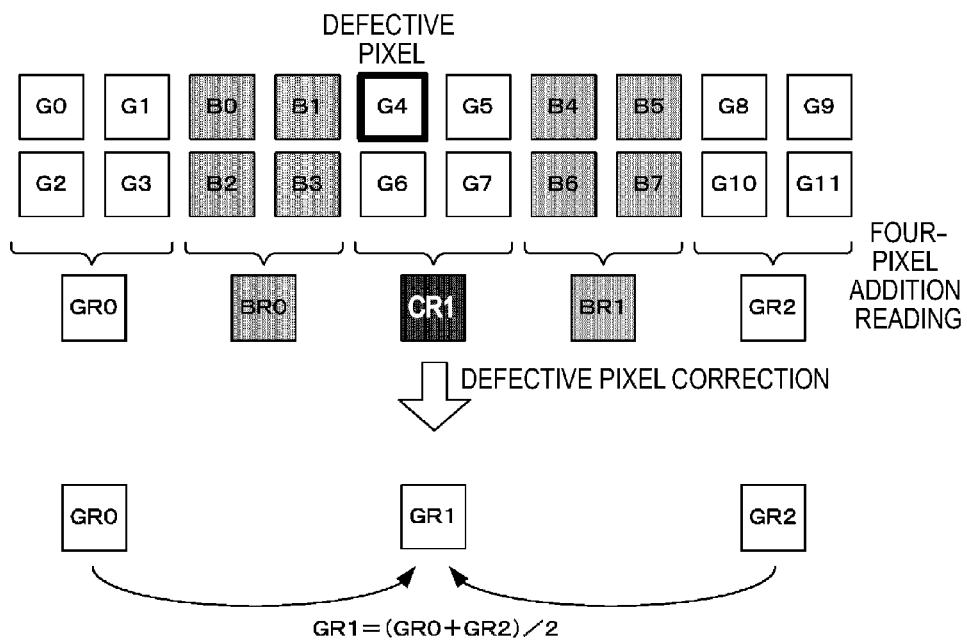
(a) DEFECTIVE PIXEL CORRECTION IN ANOTHER IMAGING APPARATUS
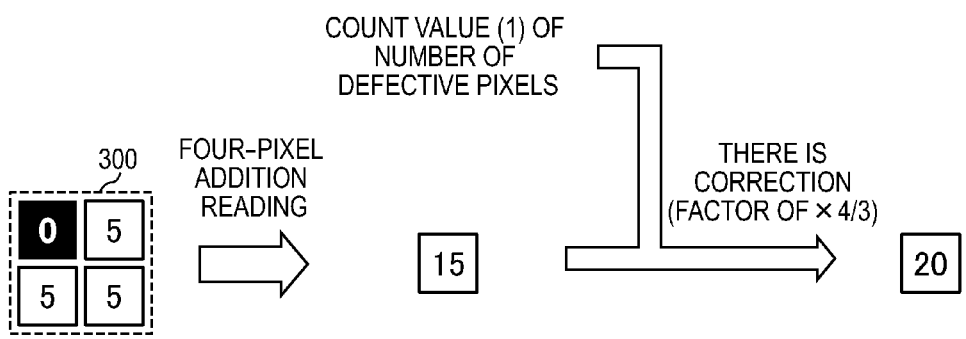
(b) DEFECTIVE PIXEL CORRECTION BY GAIN ADJUSTMENT SECTION 131

FIG. 9
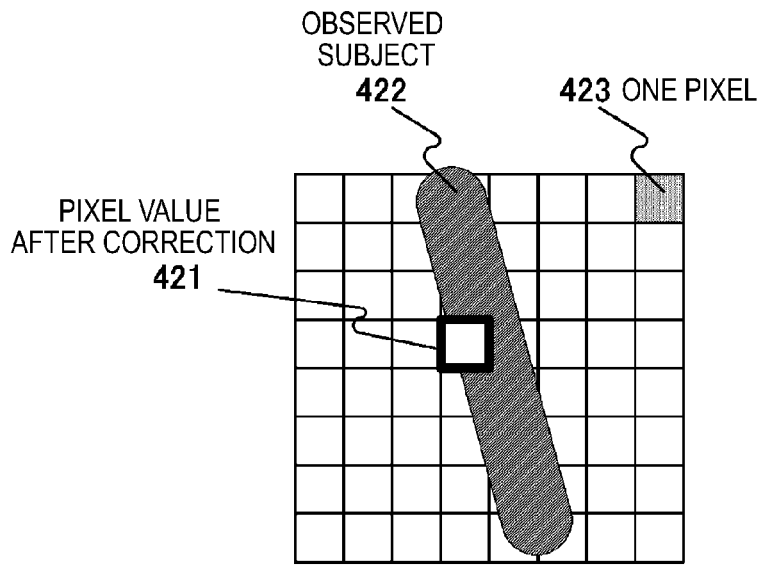
(a) DEFECTIVE PIXEL CORRECTION IN ANOTHER IMAGING APPARATUS
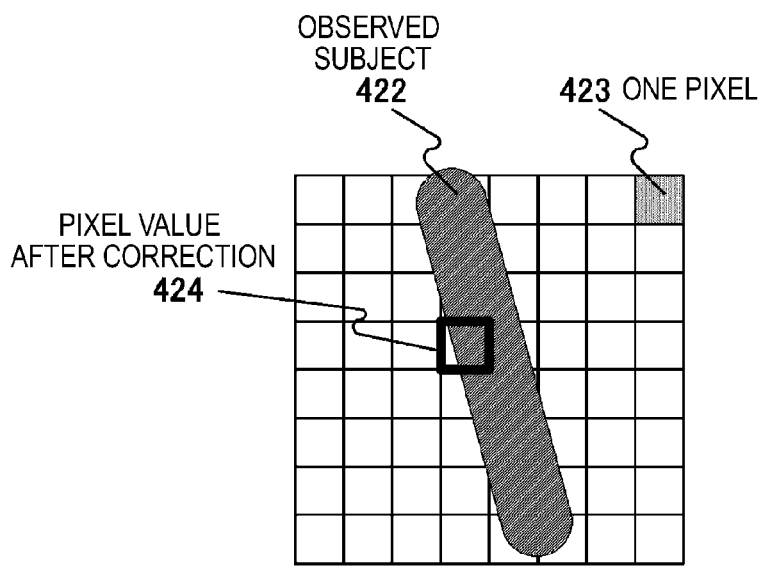
(b) DEFECTIVE PIXEL CORRECTION BY GAIN ADJUSTMENT SECTION 131

FIG. 12
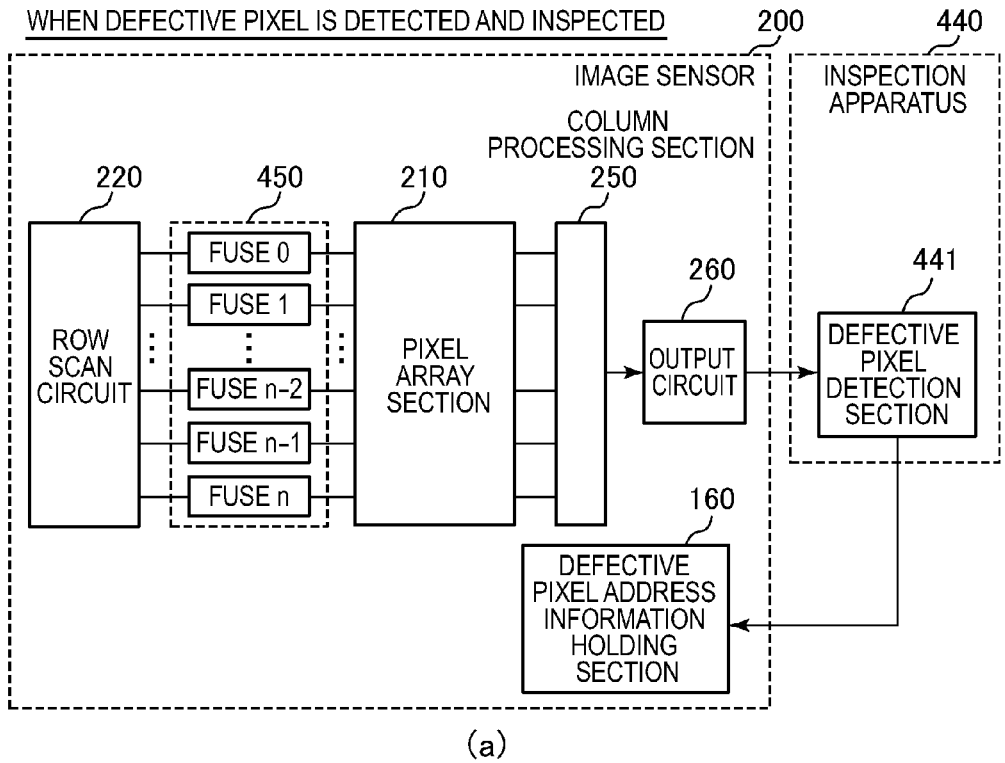
(a)
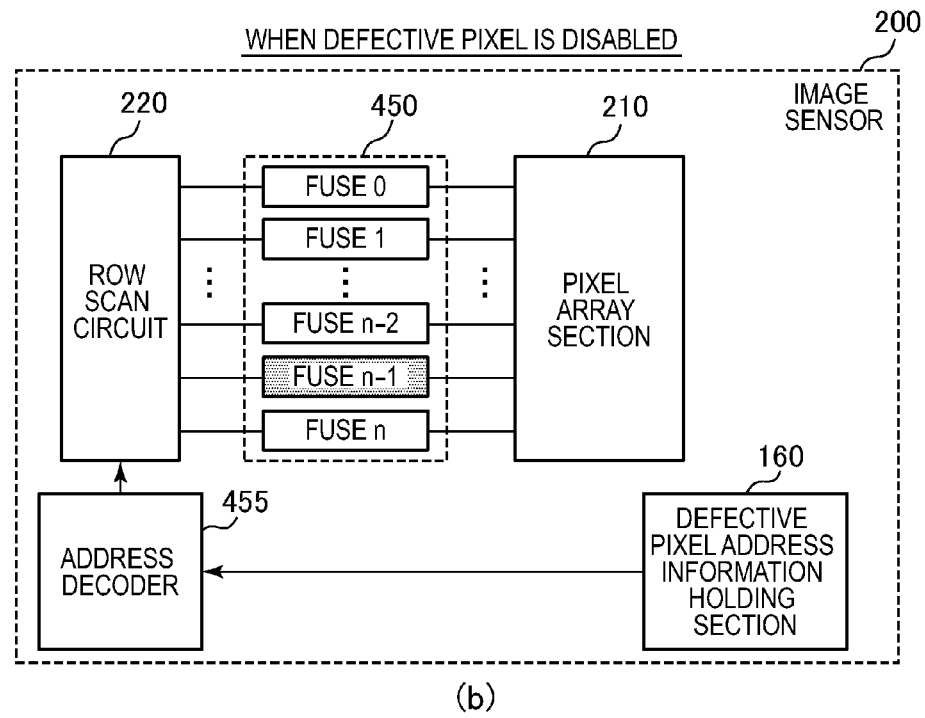
(b)

FIG. 14
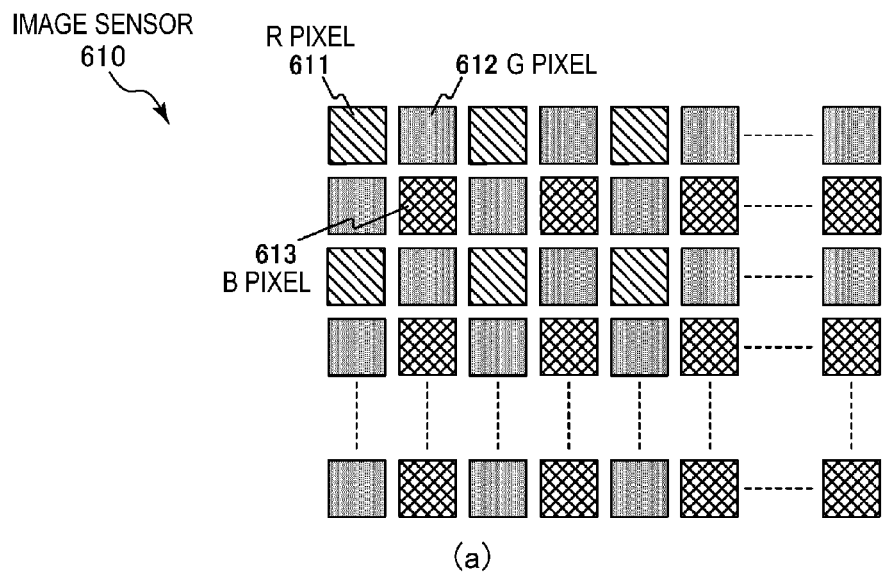
(a)
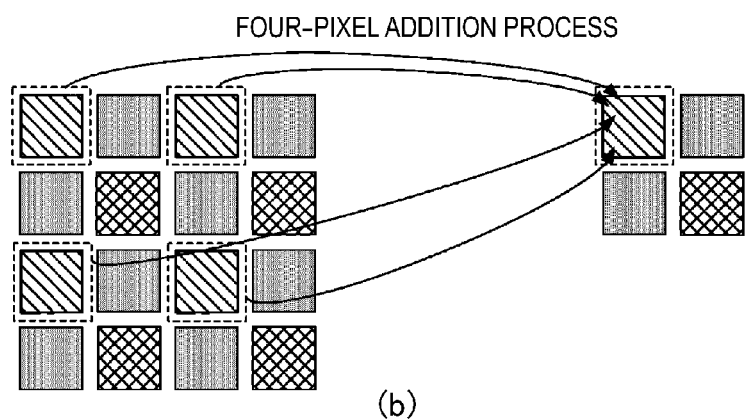
(b)
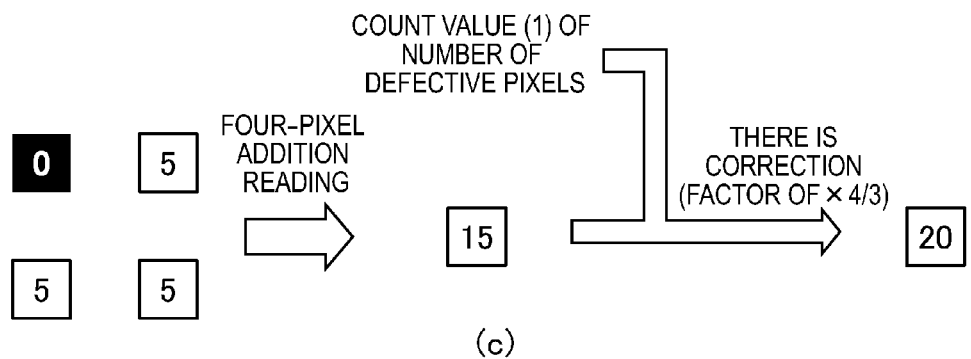
(c)

US 9,160,943 B2

IMAGING APPARATUS, IMAGING METHOD, AND PROGRAM

BACKGROUND

The present technology relates to an imaging apparatus. More particularly, the present technology relates to an imaging apparatus and an imaging method for generating image data and a program for causing a computer to execute the method.

In recent years, imaging apparatuses such as digital still cameras and digital video cameras (camera integrated recorders), which generate captured images by imaging subjects such as humans and record the generated captured images, have become widespread. In these imaging apparatuses, the number of pixels is increasing along with the reduction of a pixel size with the development of technology.

Because an amount of photons incident on each pixel at one time is reduced when the pixel size is reduced, image quality may be deteriorated or a dynamic range may be reduced due to an insufficient light amount.

Therefore, an image sensor for adding and reading pixel values of a plurality of pixels has been proposed (for example, see JP 2010-28423A).

SUMMARY

In the above-described related art, it is possible to implement a wide dynamic range by adding and reading pixel values of a plurality of pixels in which the same color filters are provided.

However, because an incorrect signal generated by a defective pixel is added to signals generated by normal pixels when the defective pixel is included among a plurality of pixels to be added, there is a concern that a pixel value after the addition is likely to be an incorrect value. Even when the above-described defective pixel is included, it is important to improve image quality.

It is desirable to improve image quality of image data.

In accordance with an embodiment of the present technology, there are provided an imaging apparatus including a correction section configured to amplify an addition pixel value, which is a value obtained by adding results of photoelectric conversion on a plurality of pixels, according to an amplification factor set based on a number of defective pixels included in the plurality of pixels, and output the amplified addition pixel value as a corrected addition pixel value., an imaging method, and a program. Thereby, there is provided a function of performing defective pixel correction by amplifying the addition pixel value according to the number of defective pixels included among the plurality of pixels generating the addition pixel value.

In addition, in the embodiment, the correction section may set the amplification factor by designating a number of black spot pixels, which does not increase the addition pixel value regardless of an amount of received light, as the number of defective pixels. Thereby, there is provided a function of performing the defective pixel correction by performing amplification according to the number of black spot pixels.

In addition, in the embodiment, the imaging apparatus may further include an image sensor configured to prevent a result of the photoelectric conversion on a white spot pixel, which increases the addition pixel value regardless of an amount of received light, from being added to the addition pixel value. The correction section may calculate the number of defective pixels by regarding the white spot pixel as the black spot pixel. Thereby, there is provided a function of calculating the number of defective pixels by determining a disabled white-spot defective pixel, which is not added to the addition pixel value, as a black-spot defective pixel.

In addition, in the embodiment, the image sensor may be provided with a fuse for preventing the result of the photoelectric conversion on the white spot pixel from being added to the addition pixel value in each pixel. The fuse of the white spot pixel may be disconnected. Thereby, there is provided a function of preventing a signal of a white-spot defective pixel from being added by disconnecting a fuse of the white-spot defective pixel.

In addition, in the embodiment, the image sensor may be provided with a logic gate for preventing the result of the photoelectric conversion on the white spot pixel from being added to the addition pixel value in each pixel. The logic gate of the white spot pixel may be in a non-conductive state. Thereby, there is provided a function of preventing a signal of a white-spot defective pixel from being added by setting a logic gate of the white-spot defective pixel to the non-conductive state.

In addition, in the embodiment, the imaging apparatus may further include a second correction section configured to generate a pixel value of a defective pixel based on a pixel value of a pixel adjacent to the defective pixel and output the generated pixel value as a corrected pixel value. When all the plurality of pixels are defective pixels, correction performed by the second correction section may be performed instead of correction performed by the correction section. Thereby, there is provided a function of performing the correction by generating pixel values of defective pixels based on a pixel value of an adjacent pixel when all a plurality of pixels are defective pixels.

In addition, in the embodiment, the amplification factor may be increased according to an increase in a proportion of the defective pixels to the plurality of pixels. Thereby, there is provided a function of setting the amplification factor that is increased according to the increase in the proportion of the defective pixels to the plurality of pixels.

In addition, in the embodiment, the correction section may calculate a normal pixel count indicating a number of normal pixels among the plurality of pixels, based on the number of the plurality of pixels and the number of defective pixels, and sets a value based on a proportion of the calculated normal pixel count to the number of the plurality of pixels as the amplification factor. Thereby, there is provided a function of setting the amplification factor based on the proportion of the normal pixel count to the number of the plurality of pixels.

According to the embodiment of the present technology described above, there is an excellent effect that image quality of image data can be improved.

BRIEF DESCRIPTION OF THE DRAWINGS

FIG. 4 is a diagram schematically illustrating two reading methods (full-pixel reading and addition reading) when a signal is read from the image sensor 200 of the embodiment of the present technology;

FIG. 8 is a diagram schematically illustrating defective pixel correction by a gain adjustment section 131 in the embodiment of the present technology and defective pixel correction in another imaging apparatus;

FIG. 9 is a diagram schematically illustrating a correction result of the defective pixel correction by the gain adjustment section 131 in the embodiment of the present technology and a correction result of the defective pixel correction in another imaging apparatus;

FIG. 12 is a diagram schematically illustrating detection of a defective pixel and a disconnection of a fuse of the defective pixel in accordance with the embodiment of the present technology;

FIG. 14 is a diagram schematically illustrating an example of an image sensor provided with color filters of a Bayer arrangement in which one R pixel, one B pixel, and two G pixels are arranged within (2×2) pixels as a first modified example of the embodiment of the present technology.

DETAILED DESCRIPTION OF THE EMBODIMENT(S)

Figure 1:
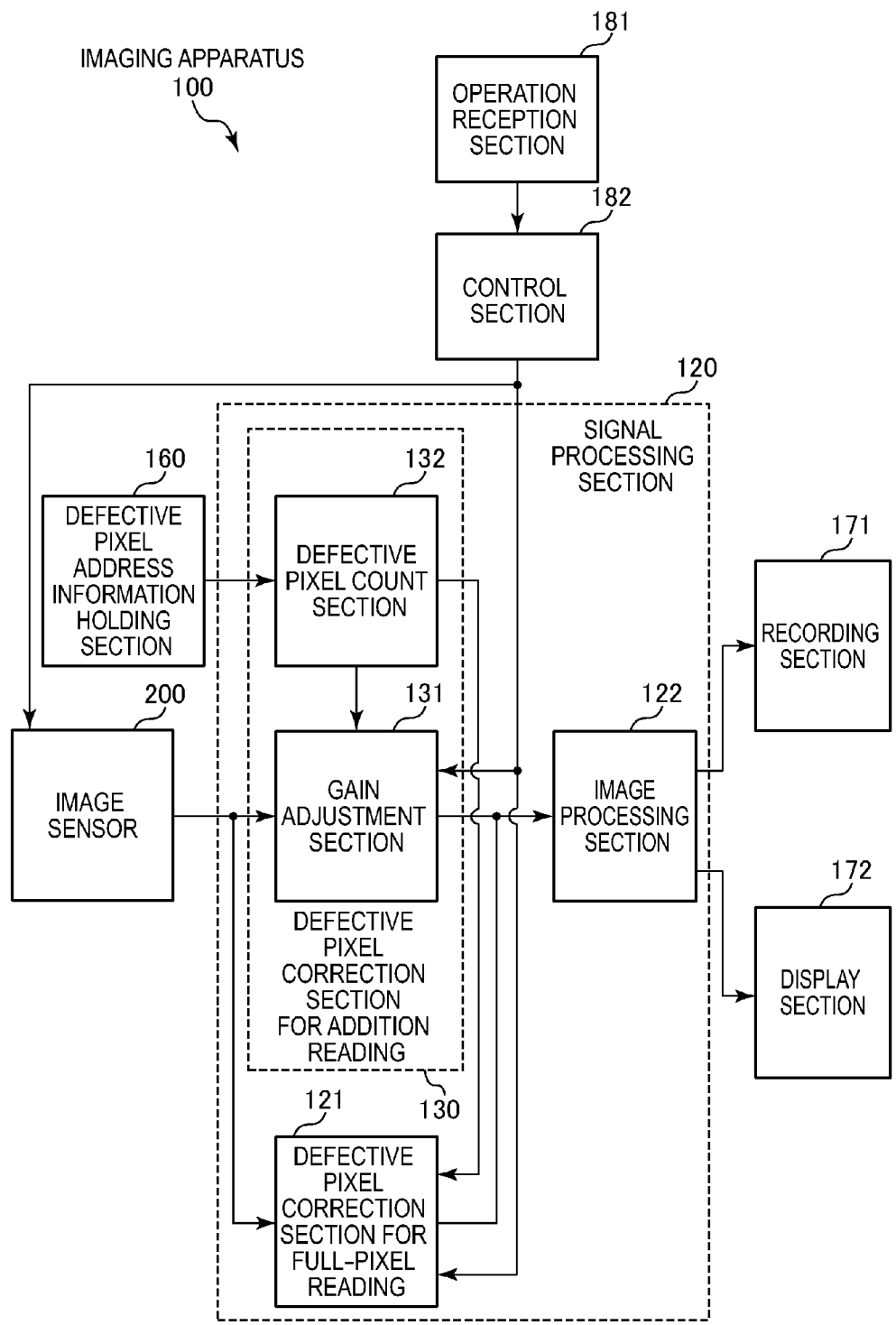
FIG. 1 is a block diagram illustrating an example of a functional configuration of an imaging apparatus 100 in accordance with an embodiment of the present technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, modes for carrying out the present technology (hereinafter referred to as the embodiment) will be described. The description will be given in the following order.

1. Embodiment of Present Technology (Imaging Control: Example in Which Defective Pixel Correction Is Performed by Amplifying Pixel Value According to Number of Defective Pixels)

2. Modified Examples

<1. Embodiment of Present Technology>

[Functional Configuration Example of Imaging Apparatus]

FIG. 1 is a block diagram illustrating an example of the functional configuration of the imaging apparatus 100 in accordance with the embodiment of the present technology.

Because the description will be given while focusing on image signal processing in the imaging apparatus 100, the description will be made by omitting elements (for example, a lens, a flash, and the like) other than those of the image signal processing in the imaging apparatus 100 from FIG. 1.

The imaging apparatus 100 is an imaging apparatus that generates image data (a captured image) by imaging a subject and records the generated image data as image content (still-image content or moving-image content). When a signal is read from an image sensor, the imaging apparatus 100 has a mode (full-pixel reading mode) in which signals are read pixel by pixel and a mode (addition reading mode) in which signals are read for every plurality of pixel signals by adding a plurality of pixel signals to integrate the plurality of pixel signals into one signal.

The imaging apparatus 100 includes an image sensor 200, a signal processing section 120, a defective pixel address information holding section 160, a recording section 171, a display section 172, an operation reception section 181, and a control section 182.

The operation reception section 181 receives an operation from a user. For example, when a shutter button (not illustrated) has been pressed, the operation reception section 181 supplies a press-related signal as an operation signal to the control section 182. In addition, when the reading mode of a signal from the image sensor has been selected by the user, the operation reception section 181 supplies a selection-related signal to the control section 182.

The control section 182 controls the operation of each section in the imaging apparatus 100. In FIG. 1, only main signal lines are illustrated and others are omitted. For example, when the shutter button has been pressed and an operation signal for starting the recording of a still image has been received, the control section 182 supplies a signal relating to the execution of still-image recording to the image sensor 200.

In addition, the control section 182 supplies the image sensor 200 and the signal processing section 120 with a signal indicating one of the full-pixel reading mode and the addition reading mode in which signals are read to generate an image.

The image sensor 200 is an image sensor that photoelectrically converts light received from a subject into an electric signal. The image sensor 200, for example, is implemented by a complementary metal oxide semiconductor (CMOS) sensor, a charge coupled device (CCD) sensor, or the like. In the embodiment of the present technology, an example in which the CMOS sensor is the image sensor 200 will be described. In the image sensor 200, a defective pixel is disabled (changed to a black defect) so that a signal output from the defective pixel is approximately a minimum value. Because the invalidation of the defective pixel will be described with reference to FIGS. 12 and 13, description thereof is omitted here.

In the embodiment of the present technology, description will be given under the assumption that the image sensor 200 is implemented by a sensor capable of reading signals for every plurality of pixels by adding a plurality of pixel signals to integrate the plurality of pixel signals into one signal. Because the image sensor 200 will be described with reference to FIG. 2, detailed description thereof is omitted here.

The image sensor 200 supplies a generated signal (pixel value) to the signal processing section 120.

The defective pixel address information holding section 160 holds information (defective pixel address information) indicating a position of a defective pixel among pixels arranged in the image sensor 200. The defective pixel address information holding section 160 can be implemented by a memory provided in the CMOS image sensor (the image sensor 200) or a memory provided in the imaging apparatus 100. The defective pixel address information holding section 160 supplies the defective pixel address information to the signal processing section 120.

The signal processing section 120 performs various signal processing on pixel values supplied from the image sensor 200. In the embodiment of the present technology, an internal configuration of the signal processing section 120 focused on correction on a signal generated by a defective pixel included in pixels arranged in the image sensor 200 (hereinafter, this correction is referred to as defective pixel correction) is shown. The signal processing section 120 includes the defective pixel correction section 130 for addition reading, a defective pixel correction section 121 for full-pixel reading, and an image processing section 122.

The defective pixel correction section 130 for the addition reading performs defective pixel correction on a pixel value generated by the addition reading. The defective pixel correction section 130 for the addition reading includes a defective pixel count section 132 and a gain adjustment section 131. Also, the defective pixel correction section 130 for the addition reading is an example of a correction section described in the claims.

The defective pixel count section 132 counts the number of defective pixels included among a plurality of pixels generating a pixel value (hereinafter referred to as an addition pixel value) generated by the addition reading among pixel values supplied from the image sensor 200. The defective pixel count section 132 counts the number of defective pixels for every addition pixel value supplied from the image sensor 200. The defective pixel count section 132 supplies the count result (the number of defective pixels) to the gain adjustment section 131.

In addition, when all the plurality of pixels generating the addition pixel value are defective pixels, the defective pixel count section 132 supplies a signal for defect notification to the defective pixel correction section 121 for the full-pixel reading.

The gain adjustment section 131 performs defective pixel correction on the addition pixel value based on the addition pixel value supplied from the image sensor 200 and the number of defective pixels relating to the addition pixel value supplied from the defective pixel count section 132. This gain adjustment section 131 performs the defective pixel correction by amplifying the addition pixel value using a gain (amplification factor) corresponding to the number of defective pixels. Because the defective pixel correction to be performed by the gain adjustment section 131 will be described with reference to FIG. 7, description thereof is omitted here. The gain adjustment section 131 supplies the addition pixel value after the defective pixel correction to the image processing section 122.

The defective pixel correction section 121 for the full-pixel reading performs defective pixel correction on a pixel value read by the full-pixel reading. A known correction method can be used as a method of correcting a pixel value read by the full-pixel reading. In the embodiment of the present technology, description will be given under the assumption that the defective pixel correction section 121 for the full-pixel reading generates a new pixel value using a pixel value generated by an adjacent pixel having the same color.

In addition, when notification indicating that all pixels generating the addition pixel value are defective pixels is provided from the defective pixel count section 132, the defective pixel correction section 121 for the full-pixel reading performs defective pixel correction by generating a new pixel value using an addition pixel value generated by pixels having the same color close to the addition pixel value.

The defective pixel correction section 121 for the full-pixel reading supplies a pixel value after the defective pixel correction to the image processing section 122. The defective pixel correction section 121 for the full-pixel reading is an example of a second correction section described in the claims.

The image processing section 122 generates an image to be used for a display or recording by performing various image processing on a pixel value on which the defective pixel correction has been performed. The image processing section 122, for example, performs signal processing such as white balance correction, gamma correction, black level correction, and image compression. The image processing section 122 supplies an image signal subjected to the signal processing as image data to the recording section 171 and the display section 172.

The recording section 171 records recording image data supplied from the image processing section 122 as image content (an image file). For example, a removable recording medium (one or more recording media) like a disk such as a Digital Versatile Disc (DVD) or a semiconductor memory such as a memory card can be used as the recording section 171. In addition, these recording media may be embedded in the imaging apparatus 100 or may be attachable to or detachable from the imaging apparatus 100.

The display section 172 displays an image supplied from the image processing section 122. The display section 172, for example, displays a monitor image (live view image), setting screens of various functions of the imaging apparatus 100, and the like. The display section 172, for example, is implemented by a color liquid crystal panel.

Next, the image sensor 200 will be described with reference to FIG. 2.

[Configuration Example of Image Sensor]

Figure 2:
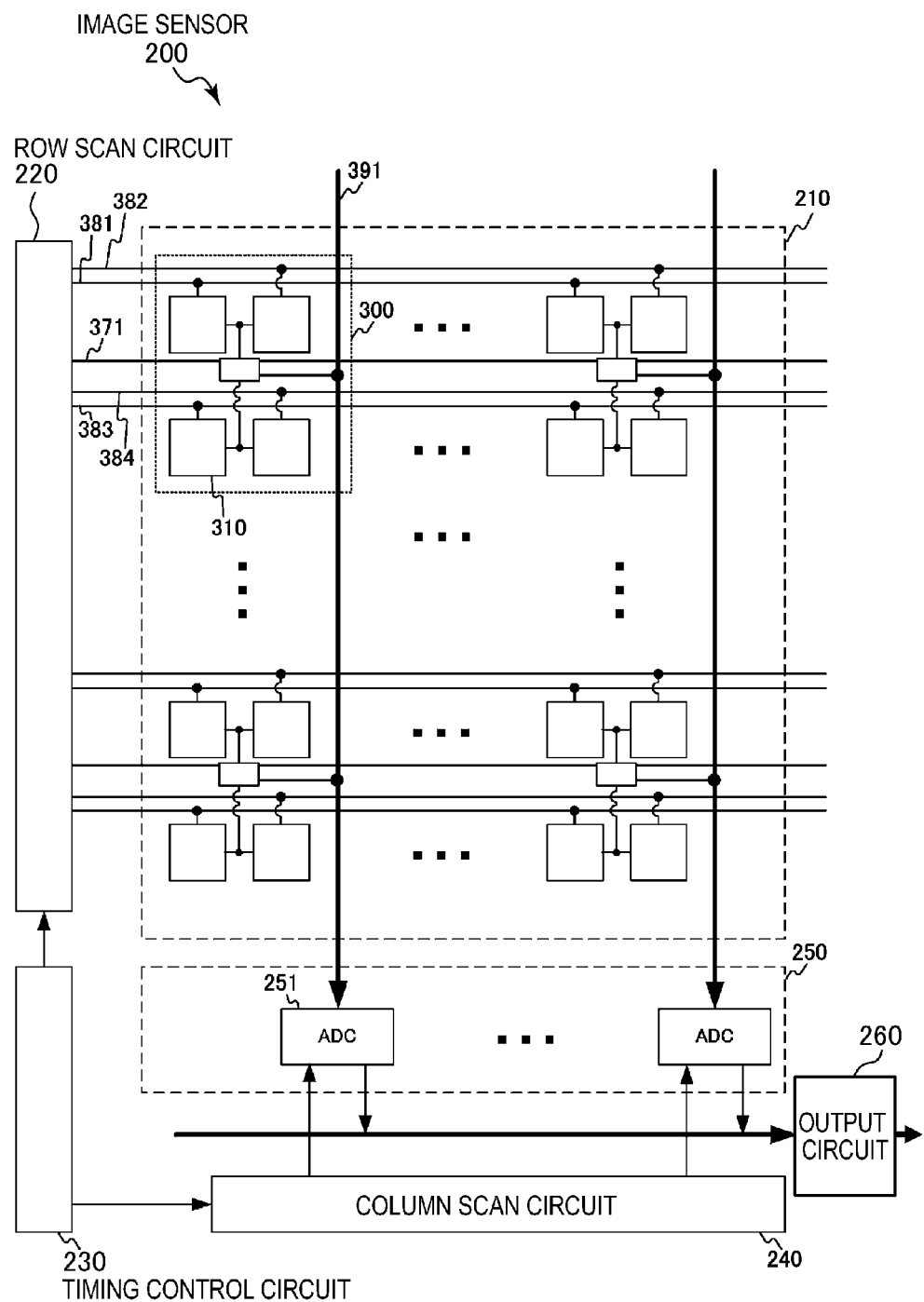
FIG. 2 is a conceptual diagram illustrating a basic configuration example of an image sensor 200 of the embodiment of the present technology.

FIG. 2 is a conceptual diagram illustrating a basic configuration example of the image sensor 200 of the embodiment of the present technology.

In FIG. 2, an example of the image sensor in which the same color filters are provided in (n×m) pixels ((2×2) pixels in the embodiment) and signals (photoelectric conversion results) of the (n×m) pixels can be added and read is illustrated. An addition method is a method such as a method of performing addition in an FD layer (hereinafter referred to as FD) (FD addition), a method of performing addition in a vertical signal line (source follower (SF) addition), or a method of adding and reading pixel signals on which analog-to-digital (AD) conversion has been performed. Although the embodiment of the present technology for adding photoelectric conversion results of a plurality of pixels can be implemented using any method, the image sensor capable of performing the FD addition will be described with reference to FIG. 2.

The image sensor 200 includes a pixel array section 210, a row scan circuit 220, a timing control circuit 230, a column scan circuit 240, a column processing section 250, and an output circuit 260.

The pixel array section 210 includes a plurality of pixels (pixels 310) arranged in a two-dimensional matrix shape. In the pixel array section 210 illustrated in FIG. 2, some of the plurality of pixels 310 are shown. In the pixels 310 in the pixel array section 210, one FD is shared by (2 (rows)×2 (columns)) pixels. In the pixel array section 210, a frame (four FD-sharing pixels 300), which refers to (2×2 pixels) pixels sharing the FD, is shown. Because one FD is provided for every two columns of pixels according to FD sharing in the pixel array section 210, one line (a vertical signal line 391) for transmitting a signal generated in a pixel is provided for every two columns of pixels.

Because it is difficult to simultaneously read two columns of pixels when the full-pixel reading is performed, reading from one row is performed by dividing the reading into two operations. Thus, two lines (charge transfer lines) for transferring electrons generated in PDs (photodiodes) of pixels to the FD are provided for one row of pixels (charge transfer lines 381 to 384). Thereby, among the two columns of pixels sharing the FD, right-column pixels can be driven separately from left-column pixels.

In addition, FIG. 2 illustrates a line (a signal line 371) in which a line for supplying the FD with a signal for resetting an FD potential is integrated with a line for supplying the FD with a signal for causing a signal generated based on the potential in the FD to flow through the vertical signal line. Because relationships between signal lines and pixels are shown along with description of a circuit configuration of the four FD-sharing pixels 300, description thereof is omitted here. Because the circuit configuration of the pixels will be described as the circuit configuration of the four FD-sharing pixels 300 with reference to FIG. 5, description thereof is omitted here.

The row scan circuit 220 supplies each pixel with a signal and selectively scans the pixels 310 in units of rows in a vertical direction (column direction) sequentially. The selective scan is performed by the row scan circuit 220 in units of rows and hence signals from pixels are output in units of rows.

In the case of the full-pixel reading, the row scan circuit 220 shifts supply timings of signals in two charge transfer lines (for example, the charge transfer lines 381 and 382) provided for one row of pixels, and reads signals by separately driving two columns of pixels sharing the FD. The selective scan of the next row is performed after the driving.

In addition, in the case of the addition reading, the row scan circuit 220 performs a selective scan in units of two rows so as to simultaneously drive two rows of pixels sharing the FD. In addition, in the case of the addition reading, the supply timings of the signals in the two charge transfer lines (for example, the charge transfer lines 381 and 382) provided for the one row of pixels are set to be simultaneous so as to simultaneously drive the two columns of pixels sharing the FD. That is, supply timings of signals in the charge transfer lines 381 to 384 become simultaneous. Thereby, signals of the (2×2) pixels are added in the FD and the added signals are read.

The timing control circuit 230 controls a timing relating to an image signal generation process for the row scan circuit 220 and the column scan circuit 240. In order to control the timing, the timing control circuit 230 functions as a timing generator for generating various timing signals for operating the sections in the image sensor 200.

For example, when a signal for starting the generation of an image by performing addition reading has been supplied from a section (for example, the control section 182 of FIG. 1) outside the image sensor 200, the timing control circuit 230 causes the sections of the image sensor 200 to perform an addition reading operation.

The column processing section 250 performs various signal processing on an analog signal output from the pixel array section 210. For example, the column processing section 250 performs a correlated double sampling (CDS) process for removing noise, an AD conversion process for digitizing an analog signal, and the like as signal processing. A circuit that performs the signal processing is provided for every vertical signal line (for every two columns of pixels). In FIG. 2, as the circuit, a circuit (AD converter (ADC) 251) that performs the AD conversion process is illustrated.

The column scan circuit 240 sequentially selectively scans a circuit section for every column (every two columns of pixels) in the column processing section 250. The column scan circuit 240, for example, includes a shift register, an address decoder, and the like. The column scan circuit 240, for example, causes a signal (pixel value) generated in the column processing section 250 to be output to the output circuit 260 by sequentially selectively scanning the circuit section (the ADC 251 in FIG. 2) for every column in the column processing section 250.

The output circuit 260 outputs a signal generated by the image sensor 200 to an external circuit. The output circuit 260 formats the signal generated by the image sensor 200 to a form receivable by the external circuit, and outputs formatted data.

Next, an arrangement of color filters provided in pixels will be described with reference to FIG. 3.

[Arrangement Example of Color Filters]

Figure 3:
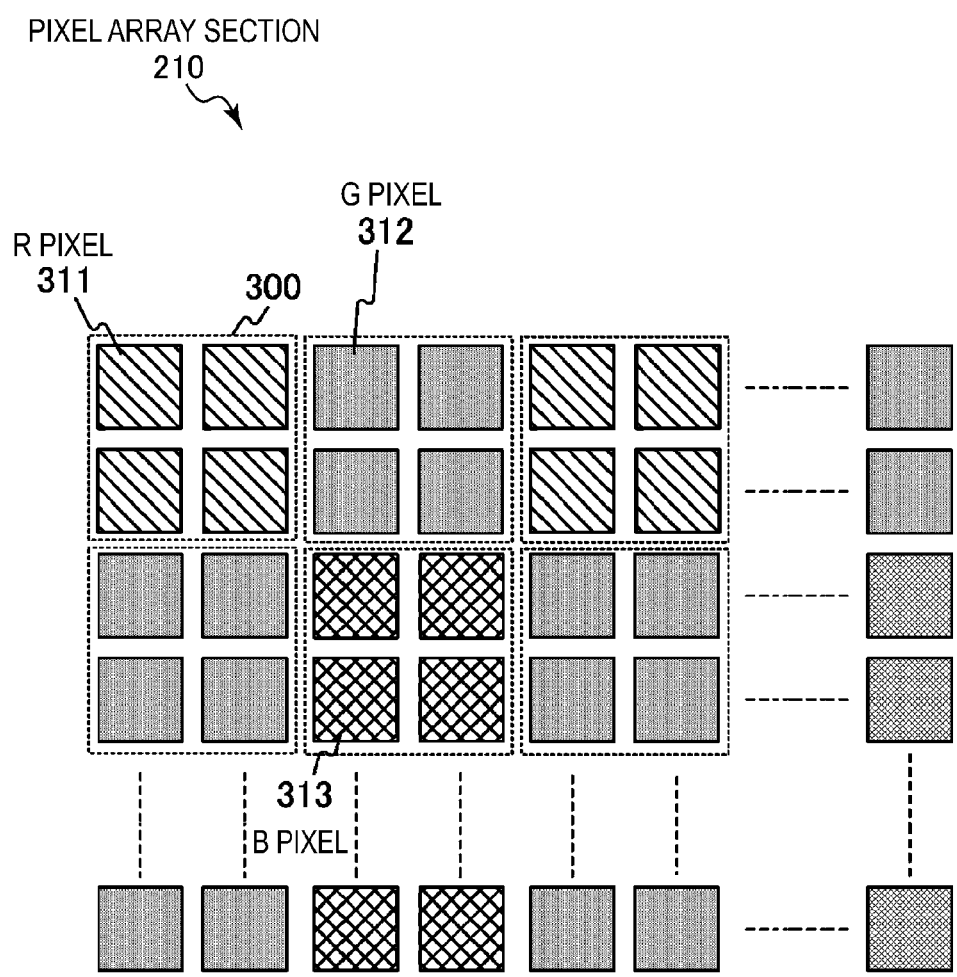
FIG. 3 is a diagram schematically illustrating an example of an arrangement of color filters in the image sensor 200 of the embodiment of the present technology.

FIG. 3 is a diagram schematically illustrating the example of the arrangement of the color filters in the image sensor 200 of the embodiment of the present technology.

In each pixel of the image sensor 200, one of a color filter (R filter) that transmits red (R) light, a color filter (G filter) that transmits green (G) light, and a color filter (B filter) that transmits blue (B) light is provided. In the pixel array section 210, the same color filters are provided in the (2×2) pixels sharing the one FD. In addition, when the (2×2) pixels are taken as one filter, a color filter arrangement is provided to be a Bayer arrangement.

In FIG. 3, a pixel (R pixel) for receiving R light according to the R filter is represented by a rectangle (an R pixel 311) hatched with diagonal lines from upper right to lower left, and a pixel (G pixel) for receiving G light according to the G filter is represented by a gray rectangle (a G pixel 312). In addition, a pixel (B pixel) for receiving B light according to the B filter is represented by a rectangle (a B pixel 313) hatched with diagonal crossed lines. In addition, in FIG. 3, a frame (four FD-sharing pixels 300), which refers to 2×2 pixels sharing the FD, is shown.

As illustrated in FIG. 3, in the pixel array section 210, two rows in which R and G pixels are alternately arranged for every two columns and two rows in which G and B pixels are alternately arranged for every two columns are alternately arranged.

Next, two reading methods (full-pixel reading and addition reading) when signals are read from the image sensor 200 will be described with reference to FIG. 4.

[Example of Signal Reading]

FIG. 4 is a diagram schematically illustrating the two reading methods (full-pixel reading and addition reading) when the signals are read from the image sensor 200 of the embodiment of the present technology.

In FIG. 4(a), pixels of (4 rows×4 columns) (four sets each having four FD-sharing pixels) are illustrated. In FIG. 4(b), signals (addition pixel values) read according to addition reading from the pixels of (4 rows×4 columns) are schematically illustrated. In addition, in FIG. 4(c), signals (pixel values) read according to full-pixel reading from the pixels of (4 rows×4 columns) are schematically illustrated.

As illustrated in FIG. 4(b), in the case of the addition reading, one pixel value (addition pixel value) is generated in outputs of a plurality of pixels sharing the FD. Thus, in FIG. 4(b), four addition pixel values generated by the four sets each having the four FD-sharing pixels are schematically illustrated.

As illustrated in FIG. 4(c), when the full-pixel reading has been performed, one pixel value is generated from one pixel. Thus, in FIG. 4(c), 16 pixel values generated from (a total of 16) pixels of (4 rows×4 columns) are schematically illustrated.

As illustrated in FIG. 4, when the addition reading has been performed by sharing the FD in the four pixels, a relationship among pixels provided in the image sensor 200 and pixel values to be generated becomes a relationship of 4:1. On the other hand, when the full-pixel reading has been performed, a relationship among pixels provided in the image sensor 200 and pixel values to be generated becomes a relationship of 1:1. When the addition reading has been performed by sharing the FD in the four pixels, an amount of data to be read is halved in both of vertical and horizontal directions. Here, because signals from one row of pixels are simultaneously read to the column processing section 250 when an output from the output circuit is at a high speed, there is no great influence on a speed even when the column is halved. On the other hand, the number of times of row switching can be halved and the reading can be performed at a high speed by halving the number of rows to be read that is the number of vertical directions.

That is, by sharing the FD in four pixels and performing the addition reading, a frame rate can be approximately halved and a high speed can be implemented, as compared to an image sensor including the FD pixel by pixel without sharing the FD. As described above, in a scheme of executing AD conversion in the column processing section 250 after pixel addition has been executed, there is a merit in that the frame rate is increased.

As illustrated in FIG. 4, a method of performing addition in the (n×m) pixels is one of effective techniques of causing an apparent pixel size to be largely viewed. Recently, the reduction in a pixel size has progressed except for high-end models for single-lens reflex cameras and the like. As described above, a decrease in the pixel size and an increase in the total number of pixels are recent trends.

However, because an amount of light capable of being received during the same exposure time is reduced when a size per pixel is reduced, image quality is deteriorated. For this, one solution is to perform an addition process on a plurality of pixels or the like.

Next, the circuit configuration of the four FD-sharing pixels will be described with reference to FIG. 5.

[Circuit Configuration Example of Four FD-Sharing Pixels]

Figure 5:
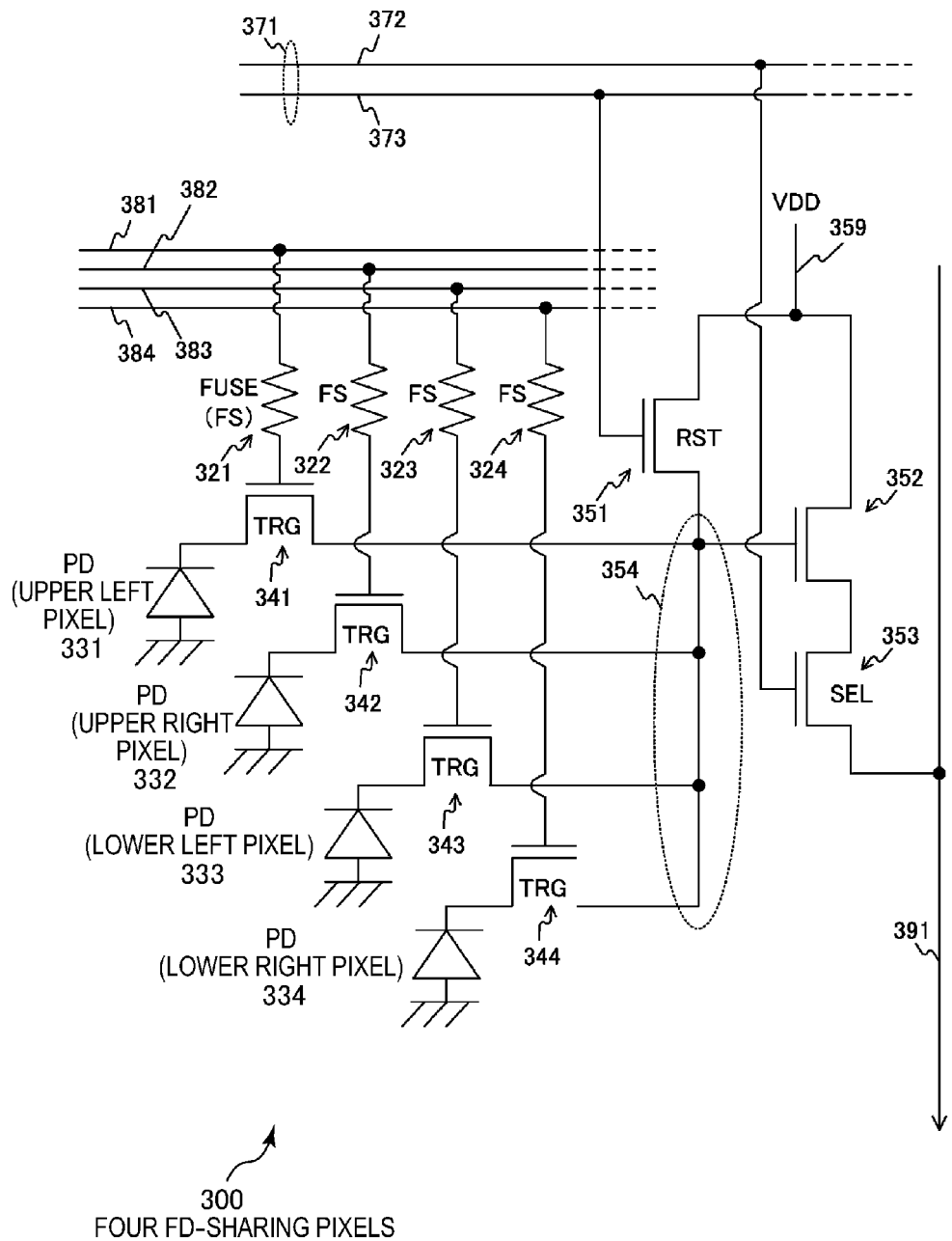
FIG. 5 is a schematic diagram illustrating an example of a circuit configuration of (2×2) pixels (four floating diffusion (FD)-sharing pixels 300) sharing an FD in accordance with the embodiment of the present technology.

FIG. 5 is a schematic diagram illustrating an example of a circuit configuration of (2×2) pixels (the four FD-sharing pixels 300) sharing the FD in accordance with the embodiment of the present technology.

The four FD-sharing pixels 300 include four pixels sharing the FD, and include four PDs 331 to 334 and four transfer transistors (transfer transistors 341 to 344). In addition, the four FD-sharing pixels 300 include four fuses 321 to 324, a reset transistor 351, an amplification transistor 352, and a selection transistor 353.

In the four FD-sharing pixels 300, the PD 331 has a grounded anode terminal and a cathode terminal connected to a source terminal of the transfer transistor 341. Likewise, the PDs 332 and 333 also have grounded anode terminals and cathode terminals that are connected to source terminals of the transfer transistors 342 to 344, respectively.

The transfer transistor 341 has a gate terminal connected to one terminal of the fuse 321 and a drain terminal connected to a source terminal of the reset transistor 351 and a gate terminal of the amplification transistor 352 via an FD (an FD 354). Likewise, the transfer transistors 342 to 344 also have gate terminals connected to one terminal of the fuses 322 to 324 and drain terminals connected to the source terminal of the reset transistor 351 and the gate terminal of the amplification transistor 352 via the FD (the FD 354). The fuses 321 to 324 have the other terminals that are connected to the charge transfer lines 381 to 384, respectively.

In addition, the reset transistor 351 has a gate terminal connected to a pixel reset line 373 and a drain terminal connected to a power supply line 359 and the drain terminal of the amplification transistor 352. In addition, the source terminal of the amplification transistor 352 is connected to a drain terminal of the selection transistor 353, and a gate terminal of the selection transistor 353 is connected to a selection line 372. In addition, a source terminal of the selection transistor 353 is connected to the vertical signal line 391.

The PDs 331 to 334 are photoelectric conversion devices for generating electric charges according to light intensity.

The transfer transistors 341 to 344 transfer electric charges generated in the PDs (the PDs 331 to 334) connected thereto to the FD 354 according to a signal (transfer pulse) from the row scan circuit 220. The transfer transistors 341 to 344, for example, are in a conductive state when signals (pulses) are supplied from the charge transfer lines (the charge transfer lines 381 to 384), and transfer electrons generated in the PDs (the PDs 331 to 334) connected thereto to the FD 354. The fuses 321 to 324 are provided between the transfer transistors 341 to 344 and the charge transfer lines (the charge transfer lines 381 to 384), respectively. When the fuse is disconnected, it is difficult to transfer electrons generated in the PD to the FD 354.

The fuses 321 to 324 are used to disable the transfer transistors (the transfer transistors 341 to 344) connected thereto. In the embodiment of the present technology, the fuses 321 to 324 are used to prevent electric charges generated from a pixel (defective pixel) in which a defect has been detected in the step of manufacturing the image sensor 200 from being transferred to the FD. Among the fuses 321 to 324, one connected to a gate terminal of a transfer transistor of a pixel determined to be defective is disconnected in the step (for example, a manufacturing process or an initial power application time) before the image sensor is used. Because the detection of the defective pixel and the disconnection of the fuse will be described with reference to FIGS. 12 and 13, description thereof is omitted here.

The reset transistor 351 is used to reset a potential of the FD 354 according to a signal (reset pulse) from the row scan circuit 220. The reset transistor 351 is in the conductive state when the reset pulse from the row scan circuit 220 is supplied to its gate terminal, and an electric current flows from the FD 354 to the power-supply line 359 and the potential of the FD 354 is reset.

The amplification transistor 352 amplifies the potential of the FD 354. When the selection transistor 353 is in the conductive state, the amplification transistor 352 outputs a signal (output signal) corresponding to the amplified potential to the vertical signal line 391.

The selection transistor 353 is used to output the signal output by the amplification transistor 352 to the vertical signal line 391. For example, the selection transistor 353 is in the conductive state when a signal (selection pulse) from the row scan circuit 220 is supplied to its gate terminal, and an output signal output by the amplification transistor 352 is output to the vertical signal line 391.

Next, a relationship between a pixel from which the fuse has been disconnected and reading of electric charges will be described with reference to FIG. 6.

[Example of Relationship between Pixel From Which Fuse Has Been Disconnected and Reading of Electric Charges]

Figure 6:
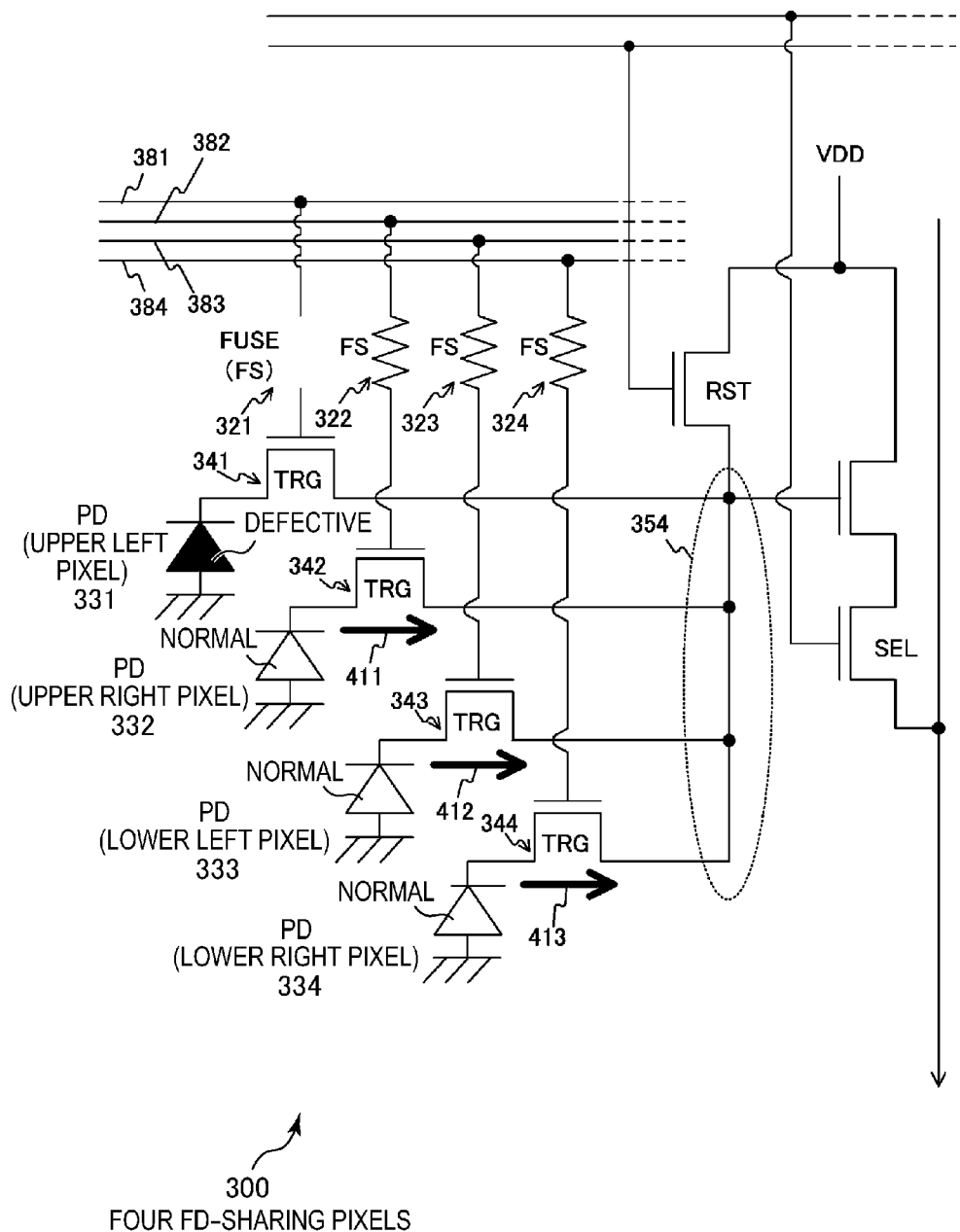
FIG. 6 is a diagram schematically illustrating reading of electric charges in the four FD-sharing pixels 300 including a pixel from which a fuse has been disconnected in accordance with the embodiment of the present technology.

FIG. 6 is a diagram schematically illustrating reading of electric charges in the four FD-sharing pixels 300 including a pixel from which a fuse has been disconnected in accordance with the embodiment of the present technology.

Also, in FIG. 6, description will be given under the assumption that the PD 331 among the four FD-sharing pixels 300 illustrated in FIG. 5 is a defective pixel, and the fuse 321 is disconnected.

When the fuse 321 has been disconnected as described above, the transition of the potential in the charge transfer line 381 is not transferred to the transfer transistor 341. Thereby, the transfer transistor 341 is constantly in a non-conductive state and electric charges generated in the pixel (the PD 331) in which the defect has been detected are not transferred to the FD 354. On the other hand, electric charges generated in normal pixels (the PDs 332 to 334) are transferred to the FD 354 (see arrows 411 to 413 in the drawing).

Next, correction of a pixel value read by addition reading in a state in which a fuse of a defective pixel has been disconnected as illustrated in FIG. 6 will be described with reference to FIG. 7.

[Example of Correction of Pixel Value of Defective Pixel]

Figure 7:
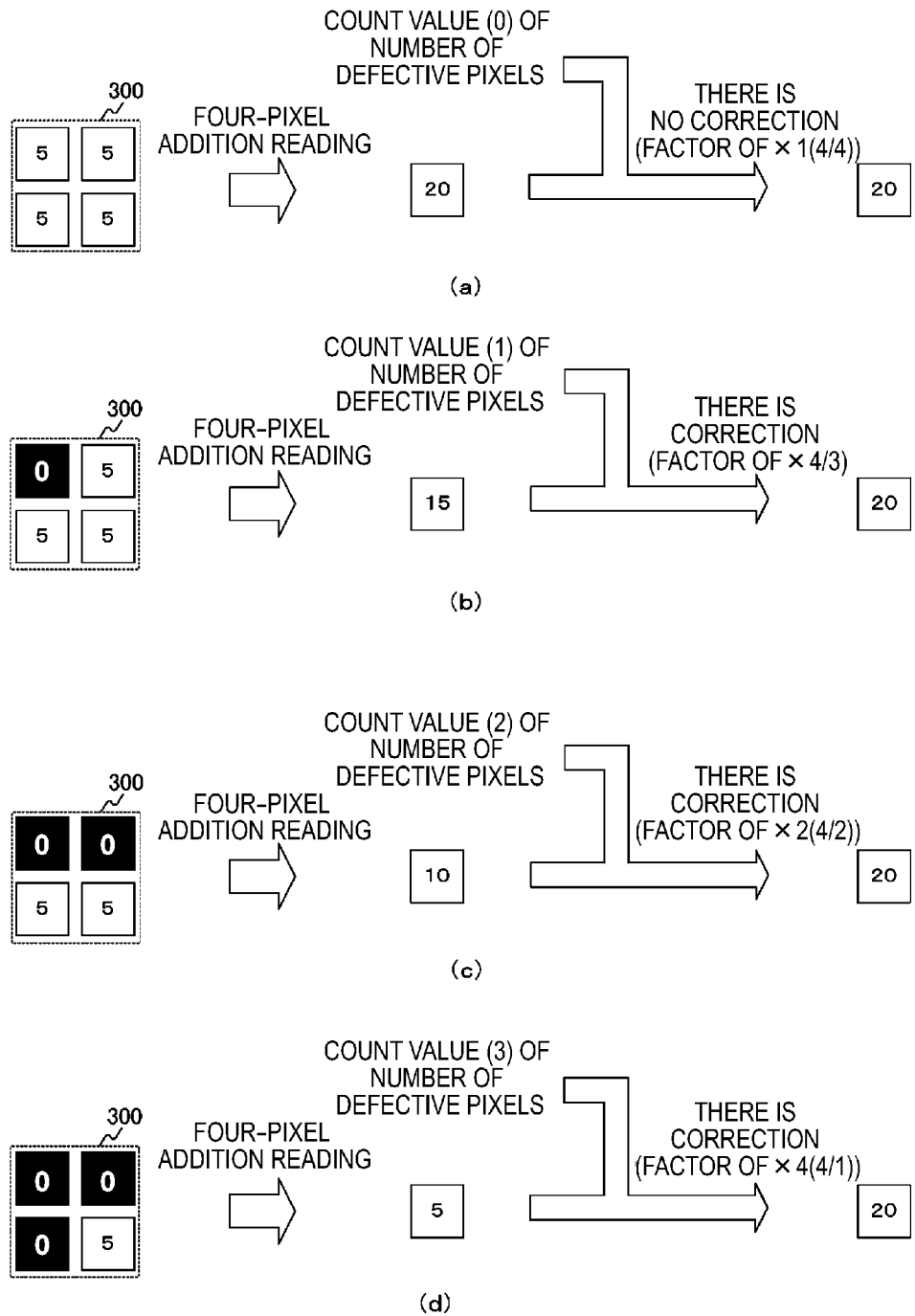
FIG. 7 is a diagram schematically illustrating an operation in which a defective pixel correction section 130 for addition reading corrects an addition pixel value generated by the four FD-sharing pixels 300 including the pixel from which the fuse has been disconnected in accordance with the embodiment of the present technology.

FIG. 7 is a diagram schematically illustrating an operation in which the defective pixel correction section 130 for the addition reading corrects an addition pixel value generated by the four FD-sharing pixels 300 including the pixel from which the fuse has been disconnected in accordance with the embodiment of the present technology.

In FIG. 7(a), correction of an addition pixel value when there is no defective pixel in four pixels sharing the FD (the four FD-sharing pixels 300) is illustrated. In FIG. 7(b), the case in which one defective pixel is included in the four FD-sharing pixels 300 is illustrated. In addition, in FIG. 7(c), the case in which two defective pixels are included in the four FD-sharing pixels 300 is illustrated. In FIG. 7(d), the case in which three defective pixels are included in the four FD-sharing pixels 300 is illustrated. In FIG. 7, a numeric value indicating an example of a pixel value is shown in a rectangle. In addition, the pixel value of the defective pixel is indicated by a rectangle marked with black.

Here, the normal pixel transfers electric charges corresponding to a value of "5" to the FD, and the defective pixel does not transfer electric charges ("0").

First, the case in which there is no defective pixel will be described. As illustrated in FIG. 7(a), when there is no defective pixel, an addition pixel value ("20") serving as a total value for electric charges ("5") generated by each of the four pixels is generated by the image sensor 200. The defective pixel count section 132 extracts information regarding a defect in the four pixels generating the addition pixel value from defective pixel address information, and calculates the number of defective pixels (a defective pixel count) among the four pixels generating the addition pixel value. Then, the defective pixel count of a value of "0" is calculated, and the defective pixel count is supplied to the gain adjustment section 131. In the gain adjustment section 131, correction is determined to be unnecessary from the value of "0," and gain processing (an amplification process) of the same factor ("x1") is performed on the addition pixel value ("20") supplied from the image sensor 200. Then, an addition pixel value ("20") after the processing is output to the image processing section 122.

In addition, when one defective pixel is included, an addition pixel value ("15") serving as a total value for electric charges ("5") generated by each of the three normal pixels is generated by the image sensor 200 as illustrated in FIG. 7(b). The defective pixel count section 132 supplies a defective pixel count of a value of "1" to the gain adjustment section 131. In the gain adjustment section 131, correction is determined to be necessary from the value of "1," and gain processing of "x4/3" is performed on the addition pixel value ("15") supplied from the image sensor 200. Then, an addition pixel value ("20") after the processing is output to the image processing section 122.

Also, when two defective pixels are included, an addition pixel value serving as a value of "10" is generated by the image sensor 200 as illustrated in FIG. 7(c). Gain processing of "x2(4/2)" is performed based on a defective pixel count of a value of "2." Then, an addition pixel value ("20") after the processing is output.

In addition, when three defective pixels are included, an addition pixel value serving as a value of "5" is generated by the image sensor 200 as illustrated in FIG. 7(d). Gain processing of "x4(4/1)" is performed based on a defective pixel count of a value of "3." Then, an addition pixel value ("20") after the processing is output.

As described above, an addition pixel value generated by the addition reading is corrected according to a proportion of defective pixels among a plurality of pixels generating the addition pixel value. The correction by the gain adjustment section 131, for example, is expressed by the following Expression (1).

$$Phd'(\text{Add}) = Phd(\text{Add}) \times N/(N-C) \quad (1)$$

Here, Phd(Add) is a pixel value (addition pixel value) generated by the addition reading, and Phd'(Add) is an addition pixel value after the gain processing. In addition, N is the total number of added pixels (2×2=4), and C is the number of defective pixels included among pixels generating the addition pixel value.

Here, a relationship between a defective pixel and a signal intensity (addition pixel value) when the addition reading is performed will be described using several expressions.

When there is no defective pixel (FIG. 7(a)), the addition pixel value (Phd(Add)) generated by the addition reading becomes the following Expression (2).

$$Phd(\text{Add}) = Phd(\text{UL}) + Phd(\text{UR}) + Phd(\text{DL}) + Phd(\text{DE}) \quad (2)$$

Here, Phd(UL) is a signal (pixel value) of a value corresponding to electric charges generated by the upper left pixel among the four pixels sharing the FD. In addition, Phd(UR) is a signal (pixel value) of a value corresponding to electric charges generated by the upper right pixel among the four pixels sharing the FD, Phd(DL) is a pixel value of a value corresponding to electric charges generated by the lower left pixel among the four pixels sharing the FD, and Phd(DR) is a pixel value of a value corresponding to electric charges generated by the lower right pixel among the four pixels sharing the FD.

Here, it is assumed that only the upper left pixel is a black spot defect (FIG. 7(b)). In this case, a value of Phd(Add) will be described. The black spot defect indicates that a value of pixel data to be output due to a pixel defect becomes approximately a minimum value as a digital output. That is, the pixel of the black spot defect is a pixel that generates a signal (electric charges) having approximately the minimum value regardless of an amount of light received by the pixel.

Because Phd(UL)=0 when the upper left pixel has the black spot defect, an addition pixel value (Phd(Add)) generated by the addition reading is expressed by the following Expression (3).

$$Phd\ (Add)=Phd\ (UR)+Phd\ (DL)+Phd\ (DR) \quad (3)$$

As illustrated in Expression (3), because electric charges are not generated due to the black spot defect, the addition pixel value Phd(Add) becomes a sum of pixel values of normal pixels.

Also, because addition is performed in adjacent (2×2) pixels in which the same color filters are provided, levels of electric charges generated in the four pixels may be approximately the same. Thus, the addition pixel value when there is a black spot defect in one pixel among the four pixels sharing the FD can be considered to be an output value that is about 3/4 of the output value when there is no defect.

That is, in four-pixel addition reading in an imager device in which adjacent (2×2) pixels have the same color filters, the defect correction is possible by correcting the black spot defect as follows.

When one pixel is defective, an amount of data to be read is increased by a factor of 4/3.

When two pixels are defective, an amount of data to be read is increased by a factor of 2.

When three pixels are defective, an amount of data to be read is increased by a factor of 4.

As described above, when a black-spot defective pixel is included in pixels to be added, it is possible to correct the defective pixel by amplifying a signal (addition pixel value) according to the number of black-spot defective pixels.

However, when the defective pixel has a white spot defect, the above-described Expression (2) is not satisfied. Here, the white spot defect indicates that a value of pixel data output due to a pixel defect is approximately maximized as a digital output. That is, a pixel of the white spot defect is a pixel that generates a signal (electric charges) with a predetermined intensity regardless of an amount of light received by the pixel.

For example, when the upper left pixel has the white spot defect, an addition pixel value (Phd(Add)) generated by the addition reading becomes the following Expression (4). M1 represents a maximum value.

$$Phd\ (Add)=M1+Phd\ (UR)+Phd\ (DL)+Phd\ (DR) \quad (4)$$

Here, because M1 is a maximum value of a digital output, Expression (4) can be rewritten as the following Expression (5).

$$Phd\ (Add)=M1 \quad (5)$$

As described above, when a signal generated in the white spot defect is included in the addition pixel value generated by the addition reading, it is difficult to perform accurate correction in a correction method when the black spot defect is included. Therefore, in the embodiment of the present technology, a transfer transistor is disabled (changed to a black defect) by disconnecting the fuse of the white-spot defective pixel, and a signal of the white-spot defective pixel is not added. Thereby, the white-spot defective pixel becomes similar to the black-spot defective pixel. The defective pixel correction for amplifying a signal (addition pixel value) according to the number of defective pixels can also be performed on the white-spot defective pixel.

Next, a difference between the defective pixel correction in addition reading in another imaging apparatus and the defective pixel correction in addition reading by the gain adjustment section 131 will be described with reference to FIGS. 8 and 9.

[Example of Effects]

FIG. 8 is a diagram schematically illustrating the defective pixel correction by the gain adjustment section 131 in the embodiment of the present technology and the defective pixel correction in another imaging apparatus.

In FIG. 8(a), the defective pixel correction in the addition reading in the other imaging apparatus is illustrated. In FIG. 8(b), the defective pixel correction by the gain adjustment section 131 in the embodiment of the present technology is illustrated. Because FIG. 8(b) is similar to FIG. 7(b), description thereof is omitted.

In FIG. 8(a), pixel values generated by pixels of (2 (rows)× 10 (columns)), pixel values (addition pixel values) generated from the pixels, and pixel values (addition pixel values) in which a defective pixel has been corrected are illustrated.

In FIG. 8(a), among the pixel values of the pixels of (2 (rows)×10 (columns)), pixel values G0 to G3 of four G pixels to be added as an addition pixel value GR0 and pixel values G4 to G7 of four G pixels to be added as an addition pixel value GR1 are illustrated. In addition, pixel values G8 to G11 of four G pixels to be added as an addition pixel value GR2, pixel values B0 to B3 of four B pixels to be added as an addition pixel value BR0, and pixel values B4 to B7 of four B pixels to be added as an addition pixel value BR1 are illustrated.

In FIG. 8(a), the pixel of G4 is assumed to be a defective pixel. In this case, when the addition reading is performed, the addition pixel value GR1 after addition including a pixel value of the pixel of G4 also becomes an incorrect value. Because a degree of inaccuracy is unclear in the other imaging apparatus, a new addition pixel value GR1 is generated based on addition pixel values generated by G pixels adjacent to pixels generating the addition pixel value GR1 in defective pixel correction on the addition pixel value. For example, in the case illustrated in FIG. 8(a), the corrected addition pixel value is generated using the following Expression (6).

$$GR1=(GR0+GR2)/2 \quad (6)$$

As described above, when an addition pixel value generated from a plurality of pixels including a defective pixel is corrected in the other imaging apparatus, defective pixel correction in which a new addition pixel value is generated using addition pixel values generated from a plurality of pixels in which the same color filters are provided and no defective pixel is further included is performed. In this defective pixel correction, a signal generated by normal pixels among the plurality of pixels including the defective pixel becomes ineffective. In addition, because distances between the pixels (G0 to G3 and G8 to G11) generating the addition pixel values serving as a correction source and the defective pixel G4 are greater than distances between the normal pixels (G5 to G7) and the defective pixel (G4), an accuracy of the correction becomes low.

On the other hand, because the defective pixel is corrected by amplifying the addition pixel value according to the number of defective pixels in the correction of the defective pixel by the gain adjustment section 131 as illustrated in FIG. 8(b), signals (pixel values) by the normal pixels adjacent to the defective pixel do not become ineffective. In addition, because positions of the pixels generating the pixel values serving as the correction source are adjacent to the defective pixel, the accuracy of the correction also becomes high.

FIG. 9 is a diagram schematically illustrating a correction result of the defective pixel correction by the gain adjustment section 131 in the embodiment of the present technology and a correction result of the defective pixel correction in another imaging apparatus.

FIG. 9(a) illustrates the correction result of the defective pixel correction in the other imaging apparatus, and FIG. 9(b) illustrates the correction result of the defective pixel correction by the gain adjustment section 131 in the embodiment of the present technology. Also, in FIGS. 9(a) and 9(b), description will be given under the assumption of an image in which a rectangle of one mass is one pixel (one pixel 423), and one object (an observed subject 422) is imaged.

Because correction for generating a new pixel value using a pixel value of an adjacent pixel of the same color is performed in the defective pixel correction in the other imaging apparatus, for example, a pixel value of a position of a correction target is newly generated using pixels of positions separated by two pixels in left and right directions. As a result, an image of the observed subject may be an incomplete image as indicated by a pixel value 421 after the correction in FIG. 9(a).

On the other hand, as indicated by a pixel value 424 after the correction in FIG. 9(b), an image accurately reflecting a picture of the observed subject is generated by performing the correction for amplifying the pixel value of the correction target according to the number of defective pixels in the defective pixel correction by the gain adjustment section 131. As described above, the accuracy of the correction is improved and image reproducibility is improved by performing the correction of amplifying the pixel value according to the number of defective pixels.

[Operation Example of Imaging Apparatus]

Next, the operation of the imaging apparatus 100 in accordance with the embodiment of the present technology will be described with reference to the drawings.

Figure 10:
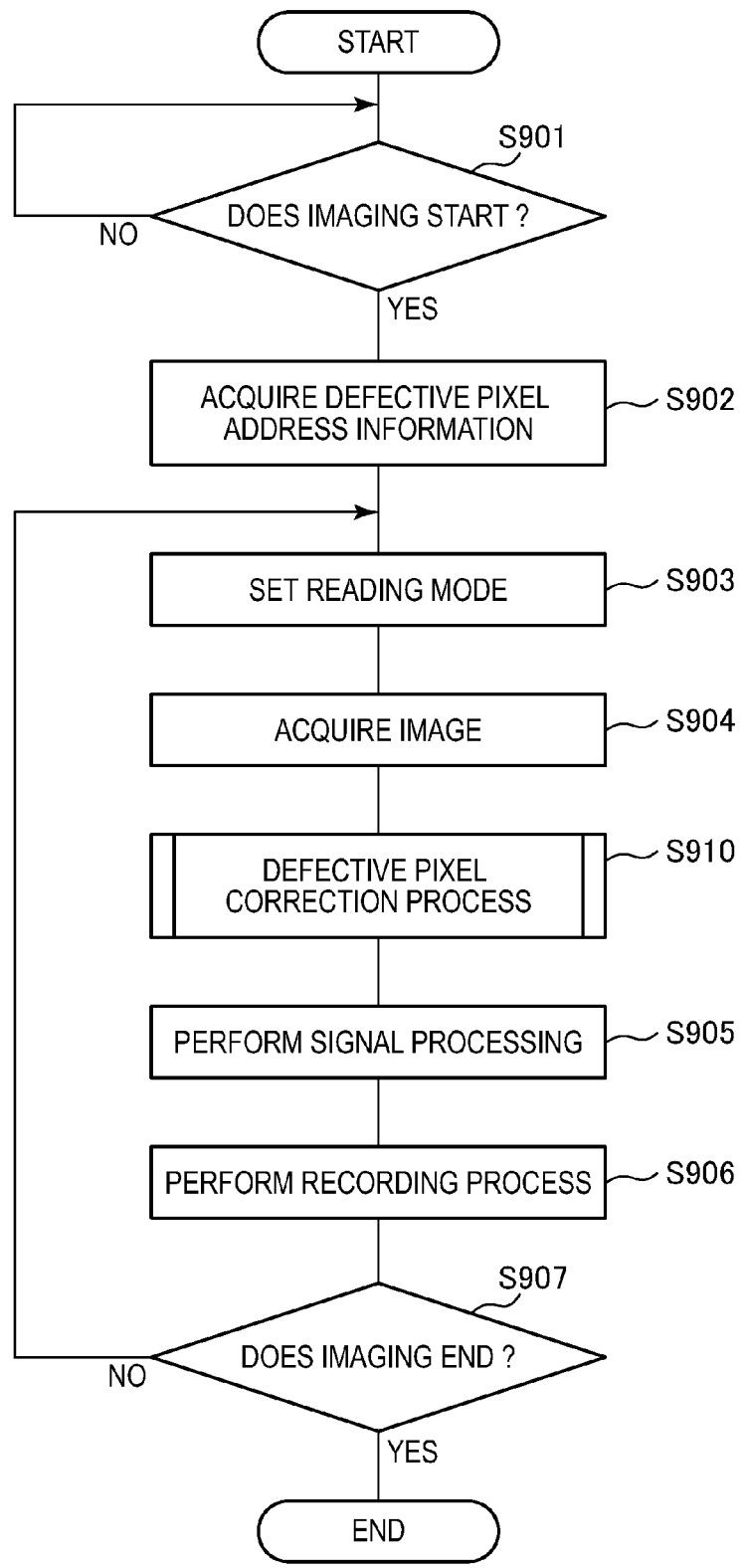
FIG. 10 is a flowchart illustrating a processing procedure example when an imaging process by the imaging apparatus 100 is performed in accordance with the embodiment of the present technology.

FIG. 10 is a flowchart illustrating a processing procedure example when an imaging process by the imaging apparatus 100 is performed in accordance with the embodiment of the present technology.

First, the control section 182 determines whether to start imaging (step S901), and waits until the imaging is started when determining that the imaging is not started.

On the other hand, when it is determined that the imaging is started (step S901), the defective pixel count section 132 acquires defective pixel address information (step S902). Then, the control section 182 sets a reading mode (an addition reading mode or a full-pixel reading mode) (step S903). Then, the user presses the shutter button and hence the image sensor 200 images a subject, so that an image is acquired in the set reading mode (step S904).

Thereafter, a defective pixel correction process of correcting a pixel value including a defective pixel among pixel values configuring the captured image is performed (step S910). Because the defective pixel correction process (step S910) will be described with reference to FIG. 11, description thereof is omitted.

Next, the image processing section 122 performs signal processing (white balance correction, gamma correction, and black level correction) other than the defective pixel correction process on image data on which the defective pixel correction has been performed (step S905). Then, after the image data has been recorded on the recording section 171 (step S906), the control section 182 determines whether to end the imaging (step S907). When it is determined that the imaging does not end, the process returns to step S903. When it is determined that the imaging ends in step S907 (for example, power OFF), an imaging processing procedure ends.

Figure 11:
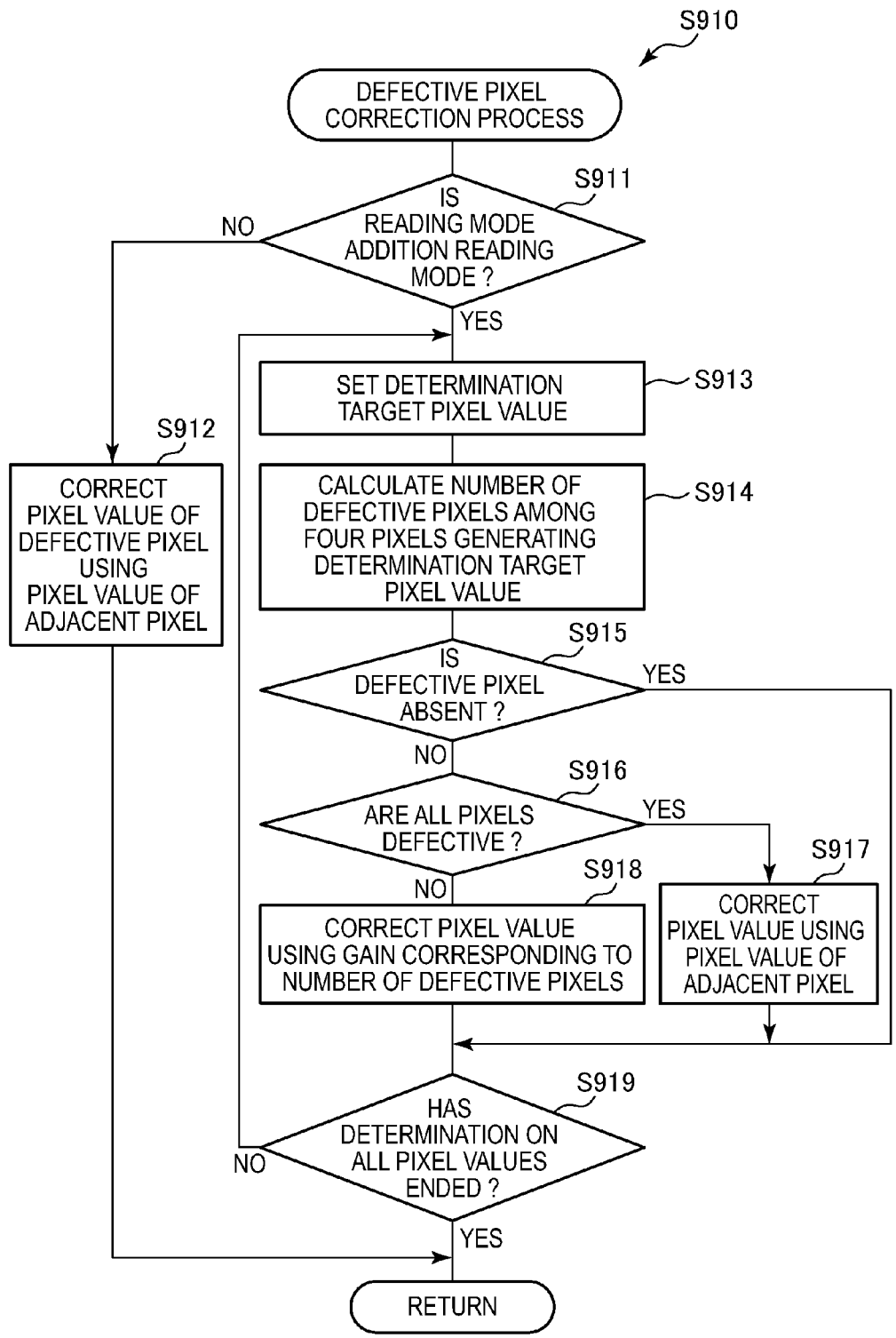
FIG. 11 is a flowchart illustrating a processing procedure example of a defective pixel correction process (step S910) in accordance with the embodiment of the present technology.

FIG. 11 is a flowchart illustrating a processing procedure example of the defective pixel correction process (step S910) in accordance with the embodiment of the present technology.

First, the defective pixel correction section 130 for the addition reading and the defective pixel correction section 121 for the full-pixel reading determine whether the reading mode is the addition reading mode when an image of a processing target has been acquired (step S911). Then, when it is determined that the reading mode is not the addition reading mode (but is the full-pixel reading mode) (step S911), a pixel value generated by a defective pixel is corrected based on pixel values of the same color adjacent to the defective pixel (step S912). This correction is performed by the defective pixel correction section 121 for the full-pixel reading, and the defective pixel correction section 130 for the addition reading is stationary. Then, after step S912, a processing procedure of the defective pixel correction ends.

On the other hand, when it is determined that the reading mode is the addition reading mode (step S911), the correction process is performed by the defective pixel correction section 130 for the addition reading. First, a pixel value (determination target pixel value) for determining the correction from pixel values (addition pixel values) included in an image is set (step S913). Then, the defective pixel count section 132 calculates the number of defective pixels (a defective pixel count) among a plurality of pixels (four FD-sharing pixels) generating the determination target pixel value using the defective pixel address information (step S914).

Next, the gain adjustment section 131 determines whether all the four FD-sharing pixels are normal (the defective pixel count is 0) (step S915). Then, when it is determined that there is no defective pixel (step S915), it is determined whether the determination of the correction on all pixel values (addition pixel values) included in the captured image ends (step S919). Here, when it is determined that the determination of the correction on all the pixel values (addition pixel values) included in the captured image does not end (step S919), the process returns to step S913.

In addition, when it is determined that not all the four FD-sharing pixels are normal (the defective pixel count is greater than or equal to 1) in step S915, it is determined whether all the four FD-sharing pixels are defective pixels (the defective pixel count is 4) (step S916). Here, when it is determined that all the four FD-sharing pixels are the defective pixels (step S916), the determination target pixel value is corrected based on pixel values (an addition pixel value) generated by pixels (four FD-sharing pixels) of the same color adjacent to a pixel generating the determination target pixel value (step S917). As described above, because it is difficult for the defective pixel correction section 130 for the addition reading to perform the correction when all the four FD-sharing pixels are the defective pixels, the defective pixel correction section 121 for the full-pixel reading performs the correction. Then, after step S917, the process proceeds to step S919.

On the other hand, when it is determined that not all the four FD-sharing pixels are the defective pixels (some are the defective pixels) (step S916), the pixel values (addition pixel value) are amplified by a gain (amplification factor) according to the number of defective pixels (step S918). Then, after the pixel values have been corrected according to the number of defective pixels in step S918, the process proceeds to step S919. Step S918 is an example of a correction procedure described in the claims.

When it is determined that the determination of correction on all pixel values (addition pixel values) included in the captured image has ended in step S919, the processing procedure of the defective pixel correction ends.

An example in which the procedure (step S916) of the determination of whether all the four FD-sharing pixels are the defective pixels and the procedure (step S917) of correction when all the four FD-sharing pixels are the defective pixels are performed has been described with reference to FIG. 11. However, the present technology is not limited thereto. For example, steps S916 and S917 may also not be performed when the imaging apparatus is produced by eliminating an image sensor in which there are four FD-sharing pixels in which all four pixels are defective pixels as a defective product.

The defective pixel correction in the addition reading in the imaging apparatus 100 has been described above. In order to perform the defective pixel correction, it is necessary to prevent a signal of a white-spot defective pixel from being added to an addition pixel value as described with reference to FIG. 7. Thus, a fuse connected to a gate terminal of a transfer transistor of a defective pixel is disconnected in the step before the image sensor is used by detecting the defective pixel in a manufacturing process.

Next, the detection of a defective pixel and the disconnection of a fuse of a white-spot defective pixel will be briefly described with reference to FIGS. 12 and 13.

[Example of Defect Detection of Image Sensor]

FIG. 12 is a diagram schematically illustrating the detection of the defective pixel and the disconnection of the fuse of the defective pixel in accordance with the embodiment of the present technology.

FIG. 12(a) schematically illustrates a functional configuration when the defective pixel is detected (when the defective pixel is detected and inspected), and FIG. 12(b) schematically illustrates a functional configuration when the fuse of the defective pixel is disconnected (when the defective pixel is disabled).

In FIGS. 12(a) and 12(b), a fuse (a fuse 450) is illustrated between a row scan circuit (the row scan circuit 220) and a pixel array section (the pixel array section 210) so as to describe a disconnection of the fuse in an image sensor (the image sensor 200). In addition, in FIG. 12(a), only an internal configuration relating to the detection of the defective pixel is illustrated as the internal configuration of the image sensor 200. Then, in FIG. 12(b), only an internal configuration relating to the disconnection of the fuse of the white-spot defective pixel is illustrated as the internal configuration of the image sensor 200.

In addition, in FIG. 12, an example in which the defective pixel address information holding section 160 illustrated in FIG. 1 is implemented by a memory provided in the image sensor 200 is illustrated.

In FIG. 12(a), the image sensor 200 and an apparatus (an inspection apparatus 440) for inspecting a defect of a pixel are illustrated.

Here, the detection of the defective pixel will be described. When the defective pixel is detected, an image is generated using the image sensor 200. The generated image is supplied to the inspection apparatus 440. In this step, all fuses (fuses 450) provided for pixels are not yet disconnected. That is, in this step, electric-charge transfers in all pixels are controlled according to control from the row scan circuit via a charge transfer line.

In a detection section (a defective pixel detection section 441) in the inspection apparatus 440, the defective pixel is detected using the supplied image. Thereafter, a position of the detected defective pixel is supplied to the defective pixel address information holding section 160, and defective pixel address information is held in the defective pixel address information holding section 160.

In FIG. 12(b), the image sensor 200 is illustrated. In the image sensor 200, an address decoder 455, which specifies the position of the defective pixel from the defective pixel address information held in the defective pixel address information holding section 160, is shown.

Here, the disconnection of the fuse of the defective pixel will be described. When the fuse of the defective pixel is disconnected, the fuse of the defective pixel specified by the defective pixel address information held in the defective pixel address information holding section 160 is disconnected.

First, the address decoder 455 specifies the position of the defective pixel based on the defective pixel address information. Then, an electric current is supplied so that the fuse provided for the pixel of the specified position is disconnected. FIG. 12(b) schematically illustrates a state in which a fuse n−1 among a plurality of fuses shown in fuses 450 is assumed to be a fuse of a defective pixel and the fuse is disconnected by supplying an excessive current to the fuse n−1.

Also, the timing at which a fuse disconnection process is performed may be the timing of the step of detecting and inspecting a defective pixel, the timing of the set-up step of initially using the imaging apparatus 100, or the like.

[Operation Example of Detection and Invalidation of Defective Pixel]

Next, a processing procedure example during detection and invalidation of a defective pixel of the imaging apparatus 100 in accordance with the embodiment of the present technology will be described.

Figure 13:
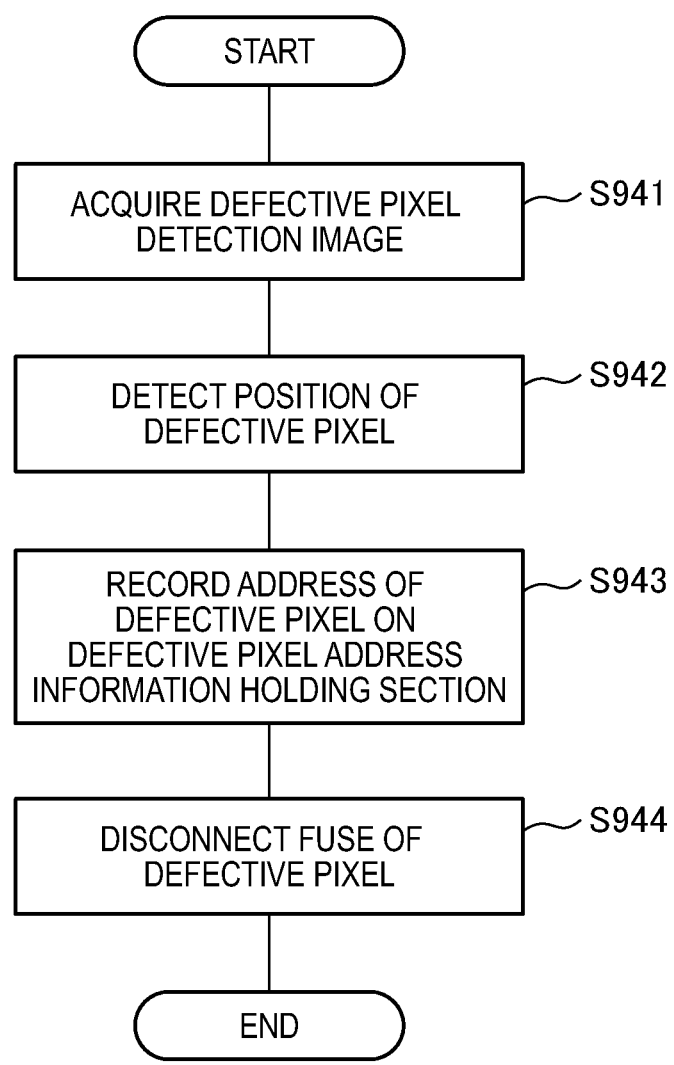
FIG. 13 is a flowchart illustrating a processing procedure example during detection and invalidation of a defective pixel of the imaging apparatus 100 in accordance with the embodiment of the present technology.

FIG. 13 is a flowchart illustrating the processing procedure example during the detection and invalidation of the defective pixel of the imaging apparatus 100 in accordance with the embodiment of the present technology.

First, an image (defective pixel detection image) for detecting a defective pixel is acquired using an image sensor of a defective pixel detection target (step S941). Next, the defective pixel detection section 441 detects a position of the defective pixel using the acquired defective pixel detection image (step S942).

Thereafter, the detected position (address) of the defective pixel is held in the defective pixel address information holding section 160 (step S943). Then, the fuse of the defective pixel is disconnected based on information (defective pixel address information) held in the defective pixel address information holding section 160 (step S944).

It is possible to perform defective pixel correction even on a white-spot defective pixel according to the correction method illustrated in FIG. 7 by detecting the defective pixel and disconnecting the fuse therefrom as illustrated in FIGS. 12 and 13.

2. MODIFIED EXAMPLES

An example in which the defective pixel correction section 130 for the addition reading corrects a pixel value (addition pixel value) read by FD addition in (2×2) pixels has been described in the embodiment of the present technology. Because defective pixel correction shown in the embodiment of the present technology can be performed when the addition pixel value is generated, the defective pixel correction can also be performed in addition of (n×m) pixels other than (2×2) pixels. Therefore, assumed modified examples of the embodiment of the present technology will be described.

FIG. 14 is a diagram schematically illustrating an example of an image sensor provided with color filters of a Bayer arrangement in which one R pixel, one B pixel, and two G pixels are arranged within the (2×2) pixels as a first modified example of the embodiment of the present technology.

FIG. 14(a) illustrates an example of an arrangement of color filters provided in the image sensor (an image sensor 610). This color filter arrangement is color filters of a general Bayer arrangement. That is, a row in which an R pixel (an R pixel 611) and a G pixel (a G pixel 612) are alternately arranged and a row in which a G pixel (a G pixel 612) and a B pixel (a B pixel 613) are alternately arranged are alternately arranged in a column direction.

FIG. 14(b) schematically illustrates an addition pixel value generated when four-pixel addition reading is performed in a Bayer arrangement illustrated in FIG. 14(a). As illustrated in FIG. 14(b), four addition pixel values are generated from (4×4) pixels. Also, correction on an addition pixel value generated from four R pixels among the (4×4) pixels will be described with reference to FIG. 14(c).

FIG. 14(c) schematically illustrates correction when R pixels illustrated in FIG. 14(b) have been read by four-pixel addition reading. In FIG. 14(c), description will be given under the assumption that one upper left pixel among four pixels to be subjected to addition reading is a defective pixel and a fuse of the defective pixel is disconnected. The drawing illustrated in FIG. 14(c) corresponds to FIGS. 7(b) and 8(c). As illustrated in FIG. 14(c), even when a position of a pixel of an addition target is separated, it is possible to perform the embodiment of the present technology by preventing a signal generated in a white-spot defective pixel from being added.

Figure 15:
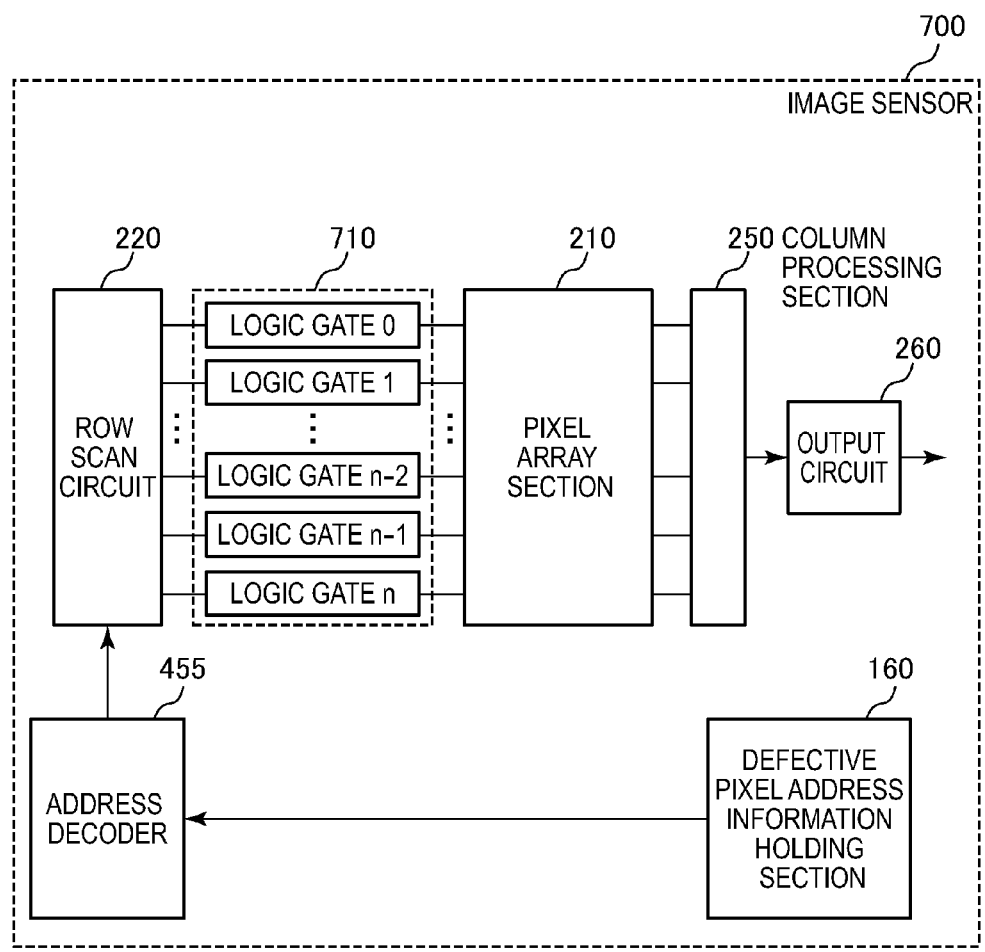
FIG. 15 is a diagram schematically illustrating an image sensor in which logic gates are provided instead of fuses as a second modified example of the embodiment of the present technology.

FIG. 15 is a diagram schematically illustrating an image sensor in which logic gates are provided instead of fuses as a second modified example of the embodiment of the present technology. In FIG. 15, a schematic diagram corresponding to FIG. 12 is illustrated.

In the image sensor illustrated in FIG. 15, logic gates (logic gates 710) are illustrated instead of the fuses 450 illustrated in FIG. 12. As described above, a logic gate (for example, an AND gate) is provided between a gate terminal of a transfer transistor and a charge transfer line, so that it is possible to prevent a signal generated in a defective pixel from being added at a signal read timing.

Although the number of wirings is increased because it is necessary to connect a wiring to a logic gate of each pixel, it is possible to perform defective pixel correction even when a process of disconnecting a fuse in advance is not performed, for example, in an image sensor having a relatively small number of pixels such as an auto-focus image sensor.

When this logic gate has been provided, a procedure (step S944) of disconnecting a fuse of a defective pixel in the flowchart illustrated in FIG. 13 is not performed. In addition, when an image is acquired in the flowchart illustrated in FIG. 10 (step S904), a logic gate of the defective pixel is disconnected. Other components are similar to those in the procedure example of the embodiment of the present technology.

As described above, in accordance with the embodiment of the present technology, it is possible to perform defective pixel correction as addition reading with a high accuracy by calculating the number of defective pixels included in a plurality of pixels whose pixel values are added is calculated and amplifying added pixel values (an addition pixel value) according to the number of defective pixels. That is, in accordance with the embodiment of the present technology, it is possible to improve image quality of image data by improving an accuracy of the defective pixel correction.

In this correction method, it is possible to perform correction with a high accuracy even when there are continuous defective pixels because correction can be performed if a normal pixel is included among a plurality of pixels to be added. In addition, because the above-described correction method can be easily manufactured by a circuit, it is possible to improve the accuracy of defective pixel correction in addition reading at low costs.

Although the description has been given under the assumption that the white-spot defective pixel occurs in a process of manufacturing an image sensor in the embodiment of the present technology, a process of disabling the white-spot defective pixel is unnecessary when the white-spot defective pixel does not occur (in the case of an image sensor in which a defective pixel becomes only a black-spot defective pixel).

Also, although a pixel in which a value of image data to be output according to a pixel defect is approximately maximized as a digital output has been described to be a white-spot defective pixel in the embodiment of the present technology, the present technology is not limited thereto. It is possible to improve image quality of a captured image by holding position information in the defective pixel address information holding section 160 along with a disconnection of a fuse for a defective pixel in which image quality is deteriorated even among defective pixels in which an intensity of a signal generated regardless of a light amount is a value other than a maximum.

Because the above-described embodiment illustrates an example for implementing the present technology, particulars described in the embodiment and particulars specifying the present disclosure in the claims have a correspondence relationship. Likewise, the particulars specifying the present disclosure in the claims and particulars to which the same name is assigned in the embodiment of the present technology have a correspondence relationship. However, the present technology is not limited to the embodiment and may be implemented by applying various modifications to the embodiment in the scope without departing from the subject matter.

In addition, the procedures described in the above-described embodiment can be understood as a method having such a series of procedures, and can be understood as a program for causing a computer to execute a series of the procedures and a recording medium storing the program. As such a recording medium, for example, a compact disc (CD), a MiniDisc (MD), a digital versatile disc (DVD), a memory card, a Blu-ray disc (registered trademark), or the like can be used.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An imaging apparatus including:
  a correction section configured to amplify an addition pixel value, which is a value obtained by adding results of photoelectric conversion on a plurality of pixels, according to an amplification factor set based on a number of defective pixels included in the plurality of pixels, and output the amplified addition pixel value as a corrected addition pixel value.
(2) The imaging apparatus according to (1), wherein the correction section sets the amplification factor by designating a number of black spot pixels, which does not increase the addition pixel value regardless of an amount of received light, as the number of defective pixels.
(3) The imaging apparatus according to (2), further including:
  an image sensor configured to prevent a result of the photoelectric conversion on a white spot pixel, which increases the addition pixel value regardless of an amount of received light, from being added to the addition pixel value, wherein the correction section calculates the number of defective pixels by regarding the white spot pixel as the black spot pixel.

(4) The imaging apparatus according to (3), wherein the image sensor is provided with a fuse for preventing the result of the photoelectric conversion on the white spot pixel from being added to the addition pixel value in each pixel, and wherein the fuse of the white spot pixel is disconnected.

(5) The imaging apparatus according to (3), wherein the image sensor is provided with a logic gate for preventing the result of the photoelectric conversion on the white spot pixel from being added to the addition pixel value in each pixel, and wherein the logic gate of the white spot pixel is in a non-conductive state.

(6) The imaging apparatus according to any one of (1) to (5), further including:

a second correction section configured to generate a pixel value of a defective pixel based on a pixel value of a pixel adjacent to the defective pixel and output the generated pixel value as a corrected pixel value, wherein, when all the plurality of pixels are defective pixels, correction performed by the second correction section is performed instead of correction performed by the correction section.

(7) The imaging apparatus according to any one of (1) to (6), wherein the amplification factor is increased according to an increase in a proportion of the defective pixels to the plurality of pixels.

(8) The imaging apparatus according to (7), wherein the correction section calculates a normal pixel count indicating a number of normal pixels among the plurality of pixels, based on the number of the plurality of pixels and the number of defective pixels, and sets a value based on a proportion of the calculated normal pixel count to the number of the plurality of pixels as the amplification factor.

(9) An imaging method including:

amplifying an addition pixel value, which is a value obtained by adding results of photoelectric conversion on a plurality of pixels, according to an amplification factor set based on a number of defective pixels included in the plurality of pixels; and outputting the amplified addition pixel value as a corrected addition pixel value.

(10) A program for causing a computer to execute:

amplifying an addition pixel value, which is a value obtained by adding results of photoelectric conversion on a plurality of pixels, according to an amplification factor set based on a number of defective pixels included in the plurality of pixels; and outputting the amplified addition pixel value as a corrected addition pixel value.

The present disclosure contains subject matter related to that disclosed in Japanese Priority Patent Application JP 2012-078650 filed in the Japan Patent Office on Mar. 30, 2012, the entire content of which is hereby incorporated by reference.

What is claimed is:

1. An imaging method comprising:

amplifying an addition pixel value, which is a value obtained by adding results of photoelectric conversion on a plurality of pixels, according to an amplification factor set based on a number of defective pixels included in the plurality of pixels; and outputting the amplified addition pixel value as a corrected addition pixel value.

2. The imaging method according to claim 1, further comprising:

setting the amplification factor by designating a number of black spot pixels, which does not increase the addition pixel value regardless of an amount of received light, as the number of defective pixels.

3. The imaging method according to claim 2, further comprising:

preventing a result of the photoelectric conversion on a white spot pixel, which increases the addition pixel value regardless of an amount of received light, from being added to the addition pixel value, and calculating the number of defective pixels by regarding the white spot pixel as a black spot pixel.

4. The imaging method according to claim 3, further comprising:

preventing the result of the photoelectric conversion on the white spot pixel from being added to the addition pixel value in each pixel by an image sensor which is provided with a fuse, and wherein the fuse of the white spot pixel is disconnected.

5. The imaging method according to claim 3, further comprising:

preventing the result of the photoelectric conversion on the white spot pixel from being added to the addition pixel value in each pixel by an image sensor which is provided with a logic gate, and wherein the logic gate of the white spot pixel is in a non-conductive state.

6. The imaging method according to claim 1, further comprising:

generating a pixel value of a defective pixel based on a pixel value of a pixel adjacent to the defective pixel and outputting the generated pixel value as a corrected pixel value.

7. The imaging method according to claim 1, wherein the amplification factor is increased according to an increase in a proportion of the number of defective pixels to the plurality of pixels.

8. The imaging method according to claim 7, further comprising:

calculating a normal pixel count indicating a number of normal pixels among the plurality of pixels, based on the number of the plurality of pixels and the number of defective pixels, and setting a value based on a proportion of the calculated normal pixel count to the number of the plurality of pixels as the amplification factor.

* * * * *